United States Patent [19]
Ito

[11] Patent Number: 5,918,903
[45] Date of Patent: Jul. 6, 1999

[54] SEAT BELT HANGING AND HOLDING MEMBER

[75] Inventor: Tadao Ito, Iwata, Japan

[73] Assignee: Enshu Co., Ltd., Shizuoka-ken, Japan

[21] Appl. No.: 08/722,164

[22] PCT Filed: Feb. 9, 1996

[86] PCT No.: PCT/JP96/00289

§ 371 Date: Jan. 15, 1997

§ 102(e) Date: Jan. 15, 1997

[87] PCT Pub. No.: WO96/24512

PCT Pub. Date: Aug. 15, 1996

[30] Foreign Application Priority Data

| Feb. 10, 1995 | [JP] | Japan | 7/023075 |
| Mar. 8, 1995 | [JP] | Japan | 7/048595 |
| Apr. 5, 1995 | [JP] | Japan | 7/080140 |

[51] Int. Cl.⁶ ............................. B60R 22/00; A47C 31/00
[52] U.S. Cl. ..................... 280/801.1; 280/808; 297/486
[58] Field of Search .................. 280/801.1, 808; 297/468, 486

[56] References Cited

U.S. PATENT DOCUMENTS

| 3,959,855 | 6/1976 | Fisher | 280/808 |
| 4,102,020 | 7/1978 | Lindblad | 280/808 |
| 4,480,853 | 11/1984 | Ando et al. | 280/801.1 |
| 4,582,340 | 4/1986 | Fohl | 280/808 |
| 4,642,853 | 2/1987 | Plesniarski et al. | 24/163 |
| 5,037,135 | 8/1991 | Kotikovsky et al. | 280/801.1 |
| 5,286,057 | 2/1994 | Forster | 280/808 |
| 5,427,412 | 6/1995 | Staniszewski | 280/808 |
| 5,513,880 | 5/1996 | Ohira et al. | 280/808 |
| 5,516,148 | 5/1996 | Ohira | 280/808 |
| 5,601,311 | 2/1997 | Pfeiffer et al. | 280/801.1 |
| 5,685,566 | 11/1997 | Hirase et al. | 280/801.1 |
| 5,762,373 | 6/1998 | Sugimoto | 280/801.1 |

FOREIGN PATENT DOCUMENTS

| 62-238146 | 10/1987 | Japan . |
| 2-32466 | 2/1990 | Japan . |
| 7-002667 | 1/1995 | Japan | 280/801.1 |
| 7-329710 | 12/1995 | Japan . |

*Primary Examiner*—Charles T. Jordan
*Assistant Examiner*—Theresa M. Wesson
*Attorney, Agent, or Firm*—Thomas, Kayden, Horstemeyer & Risley

[57] ABSTRACT

A seat belt hanging and holding member of the present invention is capable of reducing manufacturing cost by reducing the material cost required for a coating member while improving safety. The seat belt hanging and holding member 10 slidably hangs and holds a seat belt by folding back an intermediate part of the seat belt (waving belt) 74. The member 10 comprises a base member, 20 made of a metal plate having a slot 22 and a coating member 30 made of a synthetic resin which covers at least the periphery of the slot 22 of the base member 20 and is provided with a seat belt-inserting hole 31 on a part corresponding to the slot 22. The slot 22 is provided with an edge part 22a corresponding to at least the part on which the seat belt 74 is folded back, which is formed in a smoothly curved surface along the direction in which the seat belt 74 is folded back.

15 Claims, 37 Drawing Sheets

SEAT BELT HANGING AND HOLDING MEMBER

TECHNICAL FIELD

The present invention relates to a seat belt hanging and holding member for slidingly hanging a seat belt (waving belt) for example, a three-point type seat belt for an automobile.

BACKGROUND ART

In recent years, in order to achieve the safety of members riding in an automobile, a threepoint type seat belt for supporting the breast parts of the members riding in the automobile in a crossed fashion as well as a two-point type seat belt for holding the waist parts have been adopted.

FIG. 43A is a perspective view of the interior of an automobile 1, for explaining the construction of a three-point type seat belt 70. Although the three-point type seat belt may be mounted on all of the front seats and the rear seats of the automobile 1, herein only a driver's seat 2 will be described for simplicity of explanation.

The three-point type seat belt 70 is designed to be put on between the three points of a first anchor 71 provided on the lower part of a center pillar 3, a second anchor 72 mounted on a floor part between a driver's seat 2 and an assistant seat 4 and a third anchor 73 provided on the upper part of the center pillar 3. The three-point type seat belt 70 comprises a waving belt 74 one end of which is attached to the first anchor 71 and the other end of which is folded back at the part of the third anchor 73 and wound by a retractor (not shown) built in the center pillar 3 and a fixed belt 75 one end of which is attached to the second anchor 72 and the other end of which is provided with a buckle 77. A tongue part 76 to be locked in the buckle 77 is provided in an intermediate part of the waving belt 74.

FIG. 43B is a perspective view of a conventional seat belt hanging and holding member 78 to be mounted on the third anchor 73. As illustrated in FIGS. 43B and 43C, the seat belt hanging and holding member 78 comprises a base member 80 made of a steel plate (metal plate) having a bolt-inserting hole 81 and a slot 82 and a coating member 90 made of a synthetic resin for covering the periphery of the slot 82 of the base member 80 and having a seat belt-inserting hole 91 formed in the slot 82. The slot 82 is, as shown in FIG. 43C, punched out, throughout its whole periphery, substantially perpendicularly to the surface of the base member 80. Further, the slot 82 comprises, as illustrated in FIG. 44, long edge parts 82a and 82b opposed to each other, and short edge parts 82c and 82d for connecting together both-the end parts of these long edge parts 82a and 82b. The respective long edge parts 82a and 82b and short edge parts 82c and 82d are, as described above, punched out substantially at right angles with the surface of the base member 80. In addition, the seat belt-inserting hole 91 is, as shown in FIG. 44, formed so as to cover the respective long edge parts 82a and 82b and short edge parts 82c and 82d. A part extending along the one long edge part 82a serves as a folding-back and sliding part 91a for slidingly folding back the waving belt 74.

The seat belt hanging and holding member 78 constructed as mentioned above is fixed to the third anchor 73 by means of a bolt inserted into the bolt-inserting hole 81. Then, the waving belt 74 is slidingly slung and held on the folding-back and sliding part 91a. The waving belt 74 is usually subjected to an aromatic agent process to improve its sliding feature to the coating member 90.

Additionally stated, the seat belt hanging and holding member 78 is, as illustrated in FIG. 43A, formed by molding the coating member 90 integrally with the base member 80 in accordance with, what is called, an insert molding process. In other words, after the base member 80 is inserted into a metal mold for forming the coating member 90, the metal mold is closed and filled with a resin so that the coating member 90 is integrally formed with the base member 80.

In the case of the above described conventional seat belt hanging and holding-member 78, however, since the slot 82 is punched out perpendicularly to the base member 80, the slot 82 is provided with rectangular corner parts. Therefore, rectangular corner parts are formed on the coating member 90 adjacent to the slot 82. There is a risk that stress is concentrated on such rectangular corner parts. That is, there arises a risk that large stress is liable to be concentrated on the part in contact with the slot 82 in the coating member 90. Therefore, in designing the coating member 90, a large safety factor, which is deemed to be more than sufficient, is employed so that a thick coating member 90 is formed so that the coating member 90 is not broken. Accordingly, there has been a problem that the material cost required for the coating member increases, which results in high cost.

Further, in the above mentioned conventional seat belt hanging and holding member 78, as shown in FIG. 44, the waving belt 74 is slidingly slung and held on the folding back and sliding part 91a. When the waving belt 74 is abruptly pulled, however, as shown in FIG. 45, the waving belt 74 sometimes is moved toward the one short edge part 82c side of the slot 82, or as shown in FIG. 46, the waving belt 74 is concentrically gathered together to the short edge 82c side. Particularly, when the waving belt 74 concentrically comes together to the short edge 82c side, a large force is exerted on the coating member 90 from the base member 80, so that the force acting on the coating member 90 needs to be lowered.

Further, in the above mentioned conventional seat belt hanging and holding member 78, there have been problems that the resin tends to leak along the outer peripheral edge parts 83 of the base member 80, as seen in FIG. 47, because of the pressure of the resin in the insert molding and burs 90a are liable to be produced in the boundary parts 83a between the outer peripheral edges 83 and the coating member 90.

Still further, since the base member 80 is generally formed with a carbon steel having, for example, about S55C (SAE1045 to SAE1050), it is subjected to a press molding and then to a thermal treatment so that its strength is improved. Therefore, many production processes are inconveniently needed. Additionally, since deflection is generated on the base member 80 owing to the thermal treatment, when the base member 80 is inserted into the metal mold in order to form the coating member 90 in accordance with the insert molding, an excessive force for correcting the base member to a normal figure is exerted on the metal mold. This undesirably causes the life of the metal mold to be lowered. In addition, when the base member 80 is formed with the material of S55C, there has been a risk that hydrogen brittleness is, during a plating process, generated on the base member 80. Therefore, a thermal treatment to remove the hydrogen brittleness needs to be simultaneously carried out. Consequently, numerous production processes have been disadvantageously required.

Accordingly, a first object of the present invention is to provide a seat belt hanging and holding member capable of reducing manufacturing cost by lowering the material cost required for a coating member while safety is improved.

A second object of the present invention is to provide a seat belt hanging and holding member capable of supporting a force exerted upon the coating member from a base member even if a seat belt is concentrically gathered on, for example, one end side in the longitudinal direction of a slot.

Further, a third object of the present invention is to provide a seat belt hanging and holding member capable of preventing burs formed with the coating member from being produced on the boundary parts between the outer peripheral edge parts of the base member and the coating member.

Still further, a fourth object of the present invention is to provide a seat belt hanging and holding member capable of reducing the number of production processes and improving the duration of life of a metal mold into which the base member is inserted.

DISCLOSURE OF INVENTION

In order to attain the above described objects, the invention includes a seat belt hanging and holding member for slidably hanging and holding a seat belt by folding back an intermediate part of the seat belt which is provided so as to be supplied and prevented from being supplied upon emergency; the seat belt hanging and holding member comprising: a base member made of a metal plate having a slot; and a coating member made of a synthetic resin for covering at least the periphery of the slot of the base member and having a seat belt inserting hole formed on a part corresponding to the slot; the slot having an edge part corresponding to at least the folded-back part of the seat belt being formed in a curved-surface shape smoothly curved along the direction in which the seat belt is folded back.

The invention also includes a seat belt hanging and holding member, wherein the edge part of the slot corresponding to at least the folded-back part of the seat belt protrudes to one surface side of the base member and is formed in a smoothly curved surface along the direction in which the seat belt is folded back.

The invention also includes a seat belt hanging and holding member, wherein the edge part of the slot corresponding to at least the folded-back part of the seat belt protrudes to one surface side and the other surface side of the base member and is formed in a smoothly curved surface along the direction in which the seat belt is folded back.

The invention also includes a seat belt hanging and holding member for slidably hanging and holding a seat belt by folding back an intermediate part of the seat belt which is provided so as to be supplied and prevented from being supplied upon emergency; the seat belt hanging and holding member comprising: a base member made of a metal plate having a slot; and a coating member made of a synthetic resin which covers at least the periphery of the slot of the base member and has 8L seat belt inserting hole formed in a part corresponding to the slot; the end part of the slot in its longitudinal direction being formed in a smoothly curved surface along the direction in which the seat belt is deflected.

The invention also includes a seat belt hanging and holding member, wherein the end part of the slot in its longitudinal direction protrudes to one surface side of the base member and is formed in a smoothly curved surface along the direction in which the seat belt is deflected.

The invention also includes a seat belt hanging and holding member, wherein the end part of the slot in its longitudinal direction protrudes to one surface side and to the other surface side of the base member and is formed in a smoothly curved surface along the direction in which the seat belt is folded back.

The invention also includes a seat-belt hanging and holding-member for slidably hanging and holding a seat belt by folding back an intermediate part of the seat belt which is constructed so as to be supplied and prevented from being supplied upon emergency; the seat belt hanging and holding member comprising: a base member made of a metal plate having a slot into which said seat belt is inserted; and a coating member made of a synthetic resin for covering the periphery of the slot of the base member; the outer peripheral edge parts of the base member being provided with step parts set lower by one step in the boundary parts between the edge parts and the coating member.

The invention also includes a seat belt hanging and holding member, wherein the base member is formed by cold-working a raw material of high-tension steel.

According to the invention if the seat belt is in a state where it can be supplied, the seat belt can be slidingly supplied while the middle part of the seat belt is folded back on the coating member by, for example, pulling the seat belt. When the supply of the seat belt is stopped, however, a force for pulling the seat belt is directly exerted on the coating member.

The force directly exerted on the coating member is directly applied to the slot of the base member through the coating member, so that the coating member undergoes a reaction force from the edge part of the slot. However, since the edge part corresponding to the position where at least the seat belt is folded back in the slot is formed in a curved surface shape smoothly curved along the direction in which the seat belt is deflected, the stress concentration of the coating member in contact with the edge part of the slot is extremely decreased. Therefore, even when a force is exerted on the coating member from the edge part of the slot, large stress is not generated in the coating member and strength is substantially increased in comparison with that of a conventional coating member. Therefore, since the thickness of the coating member can be decreased in proportion to the increase of its strength, the material cost of the coating member can be reduced without lowering safety because of the decrease in strength of the coating member, which contributes the reduction of the cost.

Further, since the thickness of the coating member is set by employing an excessively sufficient safety factor, the coating member should not be broken. If the coating member should be broken, however the seat belt would abut against the edge part of the slot but would not be cut, because the edge part of the slot corresponding to the position where the seat belt is folded back is formed as a curved surface. Specifically stated, if the coating member should be broken, the safety should be assured by the seat belt.

Further stated, if the coating member should be broken, the seat belt would not be cut. Therefore, the thinner coating member may be formed.

According to the invention since the edge part of the slot corresponding to at least the part on which the seat belt is folded back protrudes to one surface side of the base member and formed in a smoothly curved surface along the direction in which the seat belt is folded back, the radius of curvature of the edge part can be increased. Accordingly, the stress concentration of the coating member coming into contact with the edge part can be further decreased. In addition, since a face pressure applied to the coating member from the edge part can be decreased, the force exerted on the coating member from the base member can be reduced.

According to the invention since the edge part of the slot is designed to protrude to one surface side and the other surface side of the base member, the force acting on the coating member can be further reduced.

According to the invention, since the end part in the longitudinal direction of the slot is formed in a smoothly curved surface along the direction in which the seat belt is folded back, the stress concentration of the coating member in contact with the end part of the slot can be decreased. Accordingly, if the seat belt concentrically gathers to, for example, the one end side of the slot in its longitudinal direction, the force exerted on the coating member from the end part will be distributed, and therefore, the force acting on the coating member from the base member is reduced.

According to the invention, since the end part of the slot in its longitudinal direction is designed to protrude to one surface side of the base member, or protrude to both the one surface side and the other surface side of the base member, the radius of curvature of the end part formed in a curved surface shape can be increased. Thus, the stress concentration of the coating member in contact with the end part can be lowered. Additionally, face pressure exerted on the coating member from the end part can be decreased: Accordingly, the force acting on the coating member from the base member can be further reduced.

According to the invention, since the step part set lower by one step than the outer peripheral edge part of the base member is provided in the boundary part between the outer peripheral edge part and the coating member, a resin can be prevented from leaking along the outer peripheral edge part of the base member from the boundary part during an insert molding. Consequently, the burs formed with the coating member can be prevented from being produced in the boundary part between the outer peripheral edge part of the base member and the coating member.

Additionally stated, since the leakage of the resin can be prevented as mentioned above, the closing force of the metal mold does not need to be strongly set. Therefore, the durability of the metal mold can be improved.

According to the invention since the base member is formed by cold-working the raw material of high-tension steel, the base member, whose finish accuracy of a surface and whose dimensional accuracy are extremely precise, can be obtained. Therefore, when the base member is inserted into the metal mold for insert molding, an abnormal force is not exerted on the metal mold from the base member. Thus, the duration of life of the metal mold can be improved. Further, the material of high-tension steel is worked and hardened under the cold-working so that a satisfactory strength can be obtained. As a result, the base member does not need to be subjected to a thermal treatment. Accordingly, the number of production process can be reduced. Further, since the base member is formed with the high-tension steel, there is no fear of the hydrogen brittleness after the plating process, nor is the thermal treatment for removing the hydrogen brittleness necessary. Consequently, the number of production processes can be further reduced, so that the manufacturing cost can be lowered.

BRIEF DESCRIPTION OF DRAWINGS

FIG. 1A is a perspective view, FIG. 1B is a sectional view taken along a line 1B—1B of FIG. 1A and FIG. 1C is a front view showing a base member.

FIG. 9A is a perspective view, and FIG. 9B is a sectional view taken along a line 9B—9B of FIG. 9A.

FIG. 10A is an explanatory view showing the first sectional shape of the protruding part, FIG. 10B is an explanatory view showing the second sectional shape of the protruding part and FIG. 10C is an explanatory view showing the third sectional shape of the protruding part.

FIG. 12A is an enlarged sectional view of a position corresponding to a section taken along a line 12A—12A of FIG. 9A, and FIGS. 12B and 12C are enlarged sectional views illustrating examples of forms of grooves between the protruding parts in FIG. 12A.

FIG. 14A is a front view, FIG. 14B is a sectional view taken along a line 14B—14B of FIG. 14A and FIG. 14C is an enlarged view showing a part D of FIG. 14A.

FIG. 20A is a front view and FIG. 20B is a sectional view.

FIG. 21A is a perspective view, FIG. 21B is a front view showing a base member and FIG. 21C is a sectional view taken along a line 21C—21C of FIG. 21B.

FIG. 23A is a perspective view, FIG. 23B is a front view showing a base member and FIG. 23C is a sectional view of the seat belt hanging and holding member in a position corresponding to a line 23C—23C of FIG. 23B.

FIG. 24A is a front view showing a base member and FIG. 24B is a sectional view of the seat hanging and holding member in a position corresponding to a line 24B—24B of FIG. 24A.

FIG. 37A is a front view, FIG. 37B is an enlarged view showing a step part, FIG. 37C is an enlarged view showing a first alternative example of the step part and FIG. 37D is an enlarged view showing a second alternative example of the step part.

FIG. 43A is a perspective view showing the whole construction of the three-point type seat belt, FIG. 43B is a perspective view showing a conventional seat belt hanging and holding member, and FIG.43C is a sectional view taken along a line 43C—43C of FIG. 43B.

BEST MODE FOR CARRYING OUT THE INVENTION

Figure 1A:
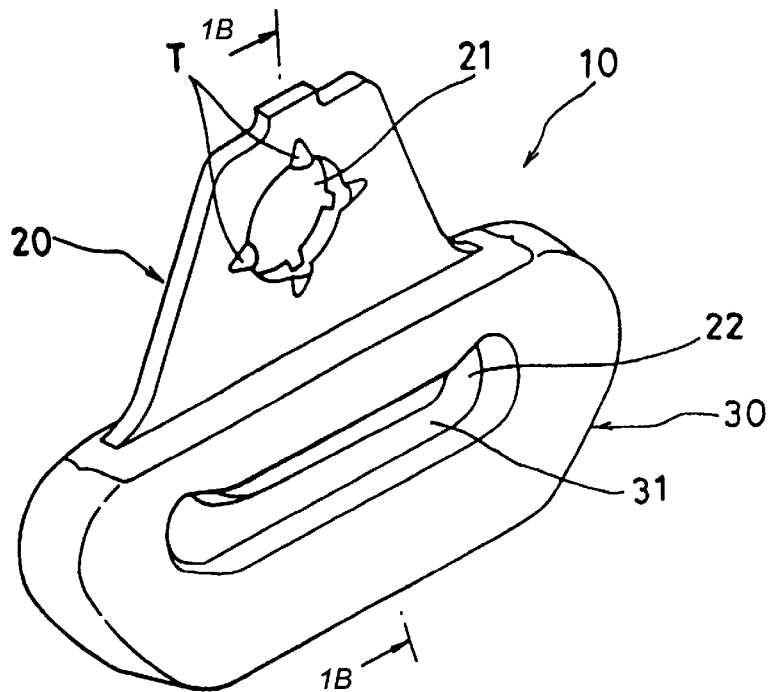
FIGS. 1A–1C show a seat belt hanging and holding member illustrated as a first embodiment of the present invention.

Now, referring to the drawings, embodiments of the present invention will be described hereinafter.

Initially, the first embodiment will be described with reference to FIGS. 1 to 8. Herein, components common to the components of the conventional example illustrated in FIG. 43 are affixed by the same reference symbols—as those of the conventional example and an explanation therefor will be omitted.

Figure 1B:
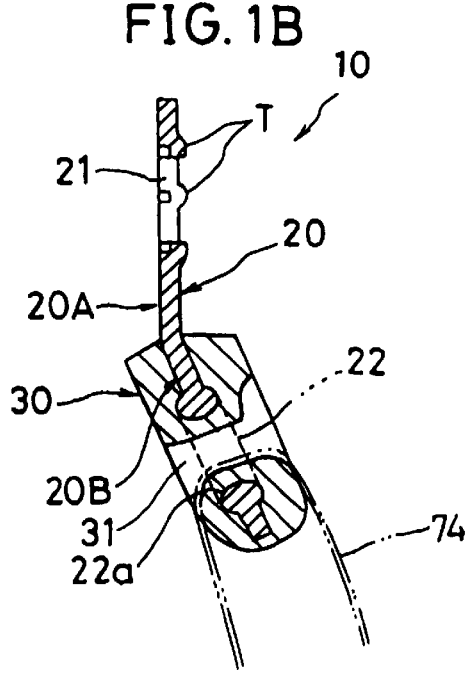
Figure 1C:
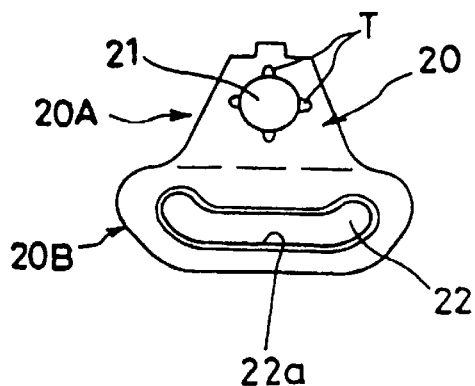
Figure 43A:
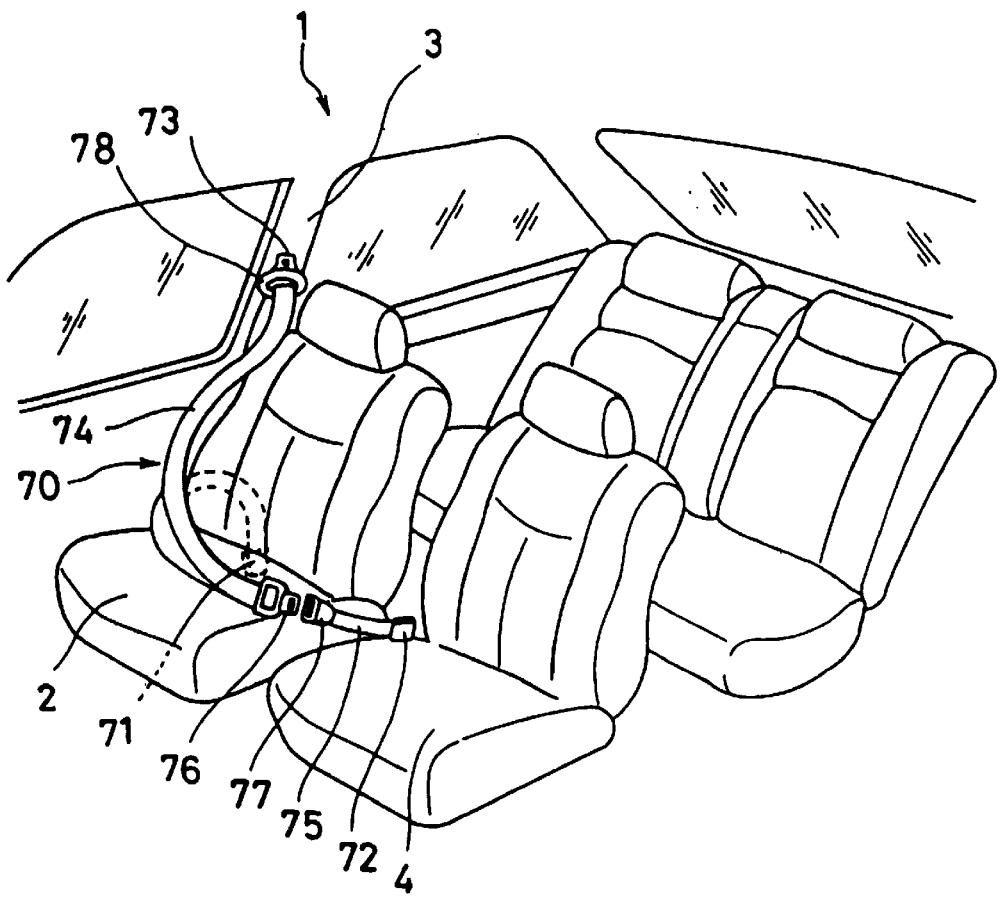
FIGS. 43A–43C are views for explaining the construction of a three-point type seat belt.

FIG. 1A is a perspective view illustrating the construction of a seat belt hanging and holding member 10 attached to the third anchor 73 of the center pillar 3 of an automobile, as has been explained in FIG. 43A. FIG. 1B is a sectional view taken along a line 1B—1B of the seat belt hanging and holding member 10 shown in FIG. 1A. FIG. 1C shows a front view of only a base member 20 of the seat belt hanging and holding member 10 before a coating member 30 is mounted thereon. Further, FIGS. 2 to 8 are explanatory views showing the respective production processes of the base member 20.

The seat belt hanging and holding member 10 is, as illustrated in FIGS. 1A, 1B and 1C, manufactured by inserting and molding the coating member 30 onto the base member 20. The base member 20 is formed by punching out a steel plate material (metal plate) having a thickness of about 3 mm and press-working it and comprises an attaching part 20A and a seat belt holding part 20B which are formed integrally with each other. The seat belt holding part 20B, is, as shown in FIG. 1B, bent or folded by a prescribed angle (30° or thereabout) relative to the attaching part 20A. A bolt-inserting hole 21 is opened on the attaching part 20A in order to attach the seat belt hanging and holding member 10 to the third anchor 73 (see FIG. 43A) of the center pillar 3 of the automobile. A slot 22 is opened in the seat belt holding part 20B.

The slot 22 has, as shown in FIG. 1B, one edge part 22a extending in its longitudinal direction and which protrudes in an elliptical shape. The edge part 22a is located at a position where a waving belt (seat belt) 74 (see FIGS. 1B and 43A) is folded back and formed in a curved shape smoothly turned along the direction in which the waving belt 74 is folded back.

The coating member 30 is, in the present embodiment, provided in the periphery of the slot 22 of the seat belt holding part 20B of the base member 20 so as to cover the base member 20 by an insert-molding, and has a part corresponding to the slot 22 which serves as a seat belt inserting hole 31 into which the waving belt 74 is inserted. In the case of the conventional seat belt hanging and holding member 78 explained in FIG. 43C, the edge part 82a of the slot 82 is cut perpendicularly to the slot 82, so that the rectangular corner parts are formed in the edge part 82a. As a result, large stress concentration has been generated on the position corresponding to the edge part 82a in the coating member 90. On the other hand, however, since the edge part 22a of the slot 22 is curved in a curved surface, in the present embodiment, only an exceedingly small stress concentration is generated in the coating member 30 in contact with the edge part 22a.

Reference symbol T in the drawings designates protruding parts T which protrude at prescribed pitches in the circumference of the bolt inserting hole 21. The protruding parts T serve as a rotation stopper of a bolt (not shown) when the seat belt hanging and holding member 10 is attached to the third anchor 73 (see FIG. 43A) of the center pillar 3 of the automobile by means of the bolt and exhibit the effect of a conventional washer. As a result, since an ordinarily employed washer is not needed when the seat belt hanging and holding member 10 is attached to the anchor, the number of parts can be decreased.

Next, a method for manufacturing the part of the slot 22 in the base member 20 will be described, referring to FIGS. 2 to 8.

Figure 2:
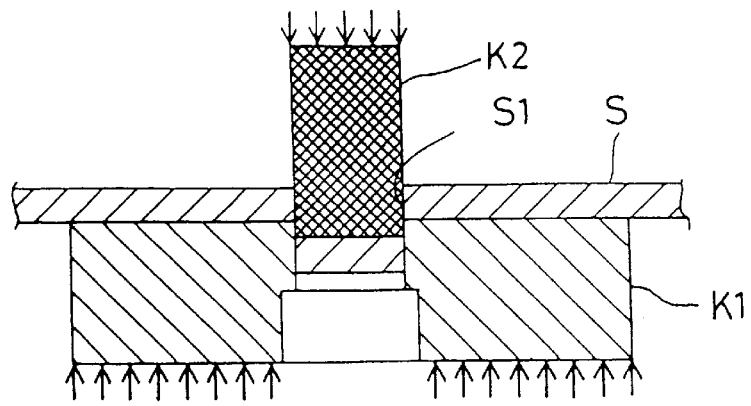
FIG. 2 is an explanatory view showing a first production process when the base member of the seat belt hanging and holding member is manufactured.
Figure 3:
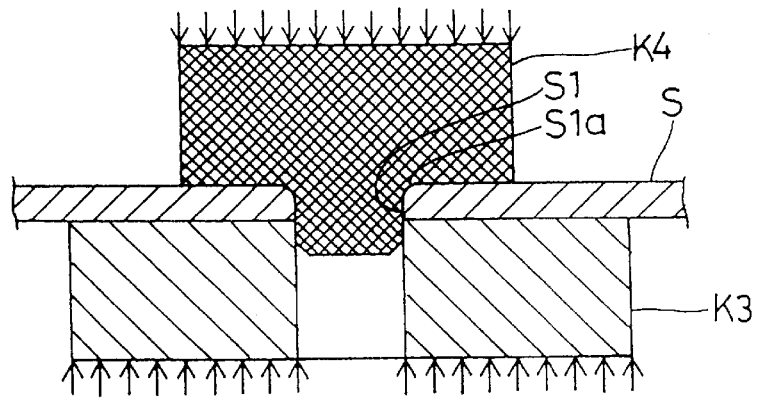
FIG. 3 is an explanatory view showing a second production process when the base member of the seat belt hanging and holding member is manufactured.
Figure 4:
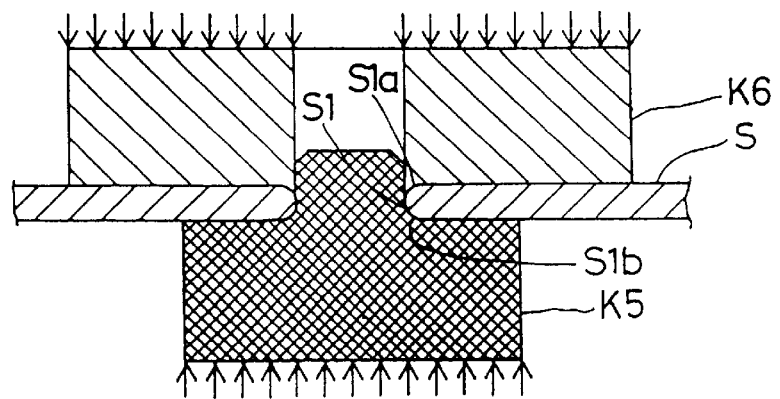
FIG. 4 is an explanatory view showing a third production process when the base member of the seat belt hanging and holding member is manufactured.

Initially, in a first process as shown in FIG. 2, a first lower hole S1 for forming the slot 22 on a steel plate S as a material of the base member 20 by using a lower metal mold K1 and a punch K2. Then, in a second process as illustrated in FIG. 3, a circular arc shaped roundness S1a is formed from the upper-part of the first lower hole S1 to the upper surface of the steel plate S by using a lower metal mold K3 and an upper metal mold K4. Further, in a third process as illustrated in FIG. 4, a circular arc shaped roundness S1b is formed from the lower part of the first lower hole S1 to the lower surface of the steel plate S by using a lower metal mold K5 and an upper metal mold K6.

Figure 5:
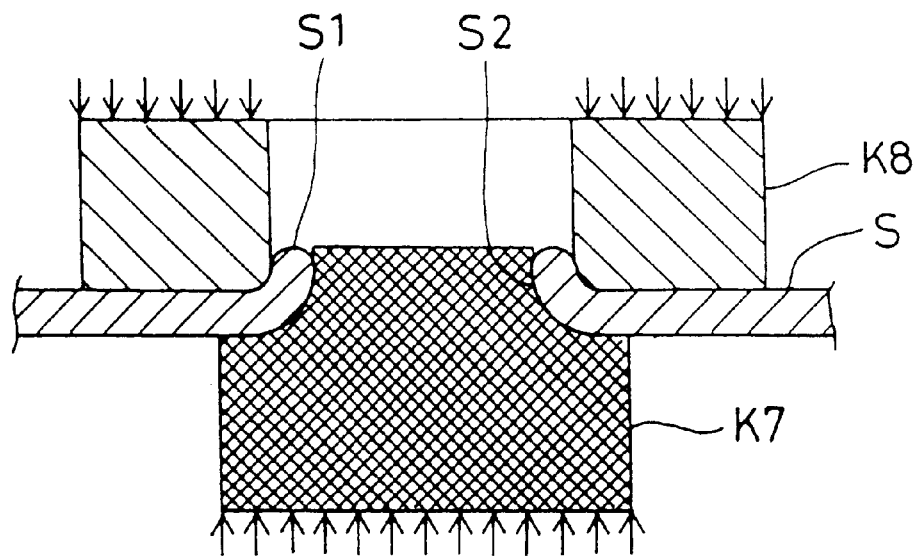
FIG. 5 is an explanatory view showing a fourth production process when the base member of the seat belt hanging and holding member is manufactured.
Figure 6:
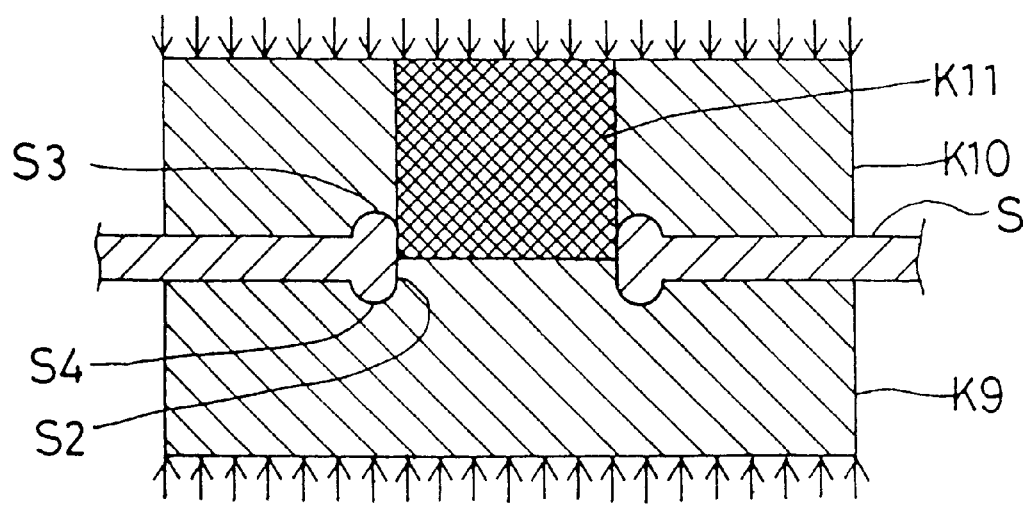
FIG. 6 is an explanatory view showing a fifth production process when the base member of the seat belt hanging and holding member is manufactured.

Thereafter, in a fourth process as seen in FIG. 5, the part of the first lower hole S1 is curved toward the upper part of the steel plate S so that a second lower hole S2 is formed. Then, in a fifth process as illustrated in FIG. 6, the part of the second lower hole S2 protruding upward is face-pressed downward by using a lower metal mold K9, an upper metal mold K10 and an intermediate metal mold K11, so that protruding parts S3 and S4 are formed which have substantially the same height from the upper and lower surfaces of the steel plate S.

Figure 7:
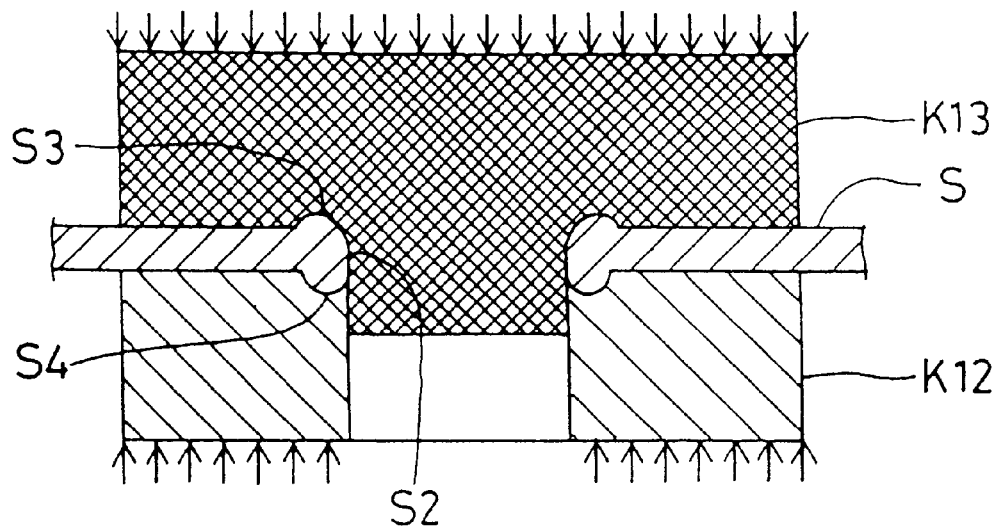
FIG. 7 is an explanatory view showing a sixth production process when the base member of the seat belt hanging and holding member is manufactured.
Figure 8:
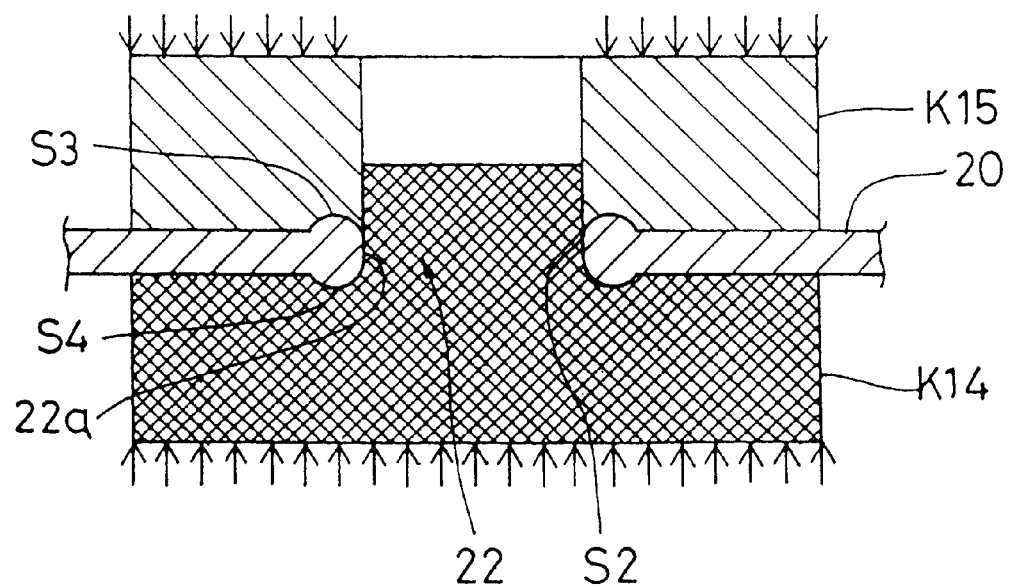
FIG. 8 is an explanatory view showing a seventh production process when the base member of the seat belt hanging and holding member is manufactured.

Further, in a sixth process as shown in FIG. 7, the protruding part S3 which protrudes upward is machined so as to be formed in an entirely smoothly curved surface by employing a lower metal mold K12 and an upper metal mold K13. At this time, the surface of the second lower hole S2 is also neatly machined. Then, in a seventh process as shown in FIG. 8, the protruding part S4 which protrudes downward is machined so as to be formed in an entirely smoothly curved surface by using a lower metal mold K14, and an upper metal mold K15. Also at this time, the surface of the second lower hole S2 is neatly machined. Thus, the slot 22 is formed by the second lower hole S2 being machined in such a way. Further, the edge pat 22a is formed with the protruding parts S3 and S4 so as to protrude in an elliptical shape relative to the steel plate S.

In such a manner, the base member 20 having the slot 22 is made from the steel plate S. In this case, the base member 20 is formed in accordance with a cold-working method. Although the method for manufacturing the base member 20 has been described by dividing it into the seven processes illustrated in FIGS. 2 to 8, as mentioned above, in practice, the method is divided into more processes and utilizes a technique for forming the base member while the steel plate is gradually deformed.

According to the seat belt hanging and holding member 10 constructed as described above, if the waving belt 74 is in a state where it can be supplied the waving belt 74 can be slidingly supplied while the intermediate part of the waving belt 74 is folded back on the coating member 30, by pulling the waving belt 74. When the waving belt 74 is stopped from being supplied, however, a force for pulling the waving belt 74 is directly exerted on the coating member 30.

The force directly applied to the coating member 30 is directly exerted on the edge part 22a of the slot 22 of the base member 20 through the coating member 30. The coating member 30 undergoes a reaction force, as its reaction, of the same magnitude as that applied to the edge part 22a, from the edge part 22a of the slot 22. However, since the edge part 22a corresponding to at least the position in the slot 22 where the seat belt is folded back is formed in a curved surface smoothly curved along the direction in which the waving belt 74 is folded back, the stress concentration of the coating member 30 in contact with the edge part 22a of the slot is significantly lowered. Therefore, even if the coating member 30 according to the present invention undergoes a force from the edge part 22a of the slot 22, large stress is not generated in the coating member 30, so that its strength is substantially more than a conventional one. Accordingly, the more the strength is increased, the more the thickness of the coating member 30 can be reduced, so that the material cost of the coating member 30 can be lowered without lowering safety owing to the deterioration of the strength of the coating member 30. Thus, the cost can be lowered.

Further, since the edge part 22a of the slot 22 protrudes to one surface side and to the other surface side of the base member 20, the radius of curvature of the edge part 22a can be increased. Therefore, the stress concentration of the coating member 30 in contact with the edge part 22a can be decreased. In addition, since the face pressure exerted on the coating member 30 from the edge part 22a can be decreased, a force applied to the coating member 30 from the base member 20 can be reduced.

Additionally, since the thickness of the coating member 30 is set by employing an excessive safety factor, the coating member 30 should not be damaged. If the coating member 30 should be damaged, however, the waving belt 74 would not collide with the edge part 22a of the slot 22 so that it would be cut, because the edge part 22a in the slot 22 corresponding to the position where the waving belt 74 is folded back is formed in a curved surface. In other words, if the coating member 30 should be broken, safety by the waving belt 74 could be ensured.

Further, if the coating member should be damaged, the waving belt 74 would not be cut. Therefore, the coating member 30 may be formed in a thinner shape.

Figure 9A:
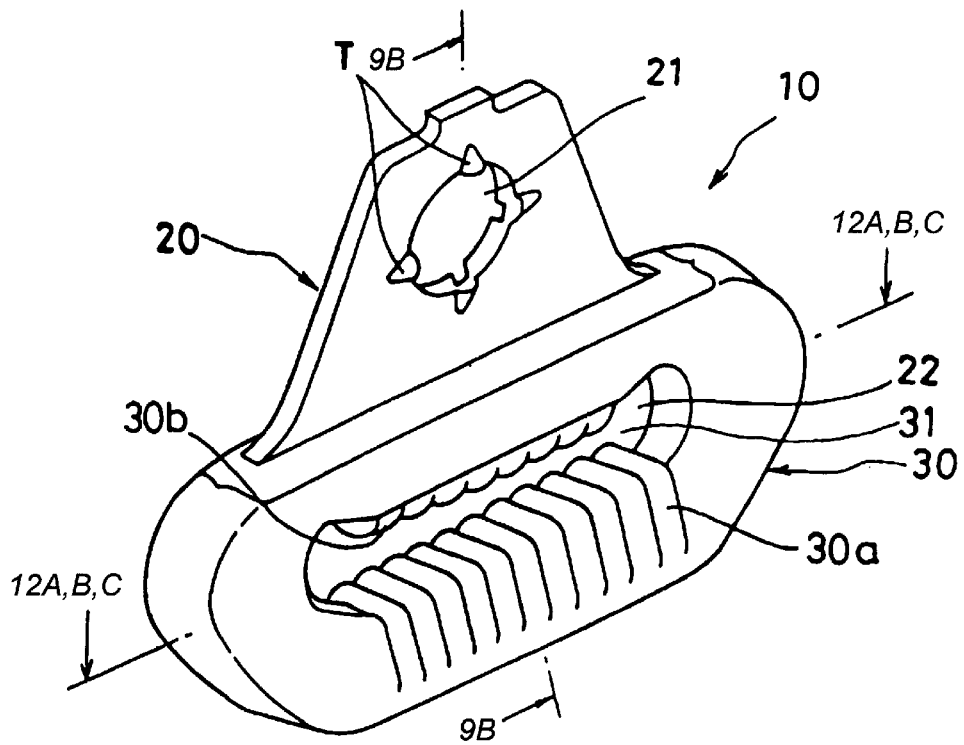
FIGS. 9A and 9B show a seat belt hanging and holding member illustrated as a second embodiment of the present invention.
Figure 9B:
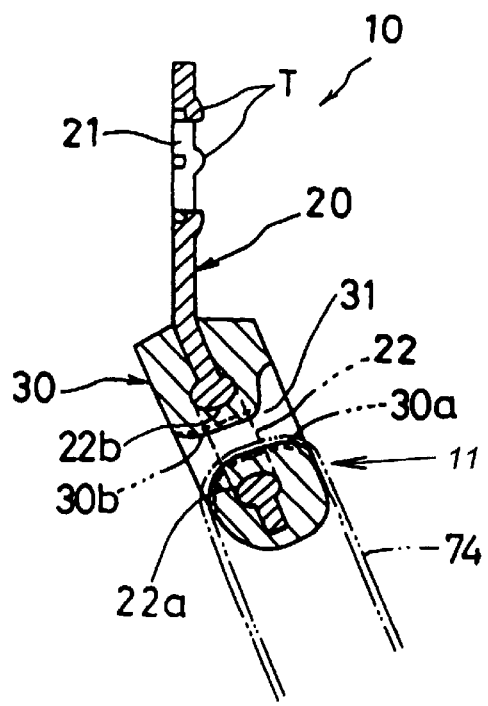

Now, referring to FIGS. 9A and 9B, a second embodiment of the present invention will be described. FIG. 9A is a perspective view showing the construction of a seat belt hanging member 10 of the second embodiment of the present invention. FIG. 9B is a sectional view taken along a line 9B—9B of FIG. 9A. Herein, components common to those in the first embodiment illustrated in FIGS. 1A–1C are affixed by the same reference symbols as those in FIGS. 1A–1C and an explanation therefor is omitted. The second embodiment is different from the first embodiment in that protruding parts 30a and 30b are formed on the coating member 30.

That is, a plurality of protruding parts 30a and 30b are formed in the positions corresponding to the parallel edge parts 22a and 22b (an edge near the bolt inserting hole 21 is designated by the reference symbol 22b and an edge remote from the inserting hole 21 is designated by the reference symbol 22a) in the slot 22, as seen in FIGS. 1A and 1B. These protruding parts 30a and 30b are formed in parallel with the direction in which the waving belt 74 is inserted. In the second embodiment, about eleven lower protruding parts 30a—are formed and about nine upper protruding parts 30b are formed.

Although the protruding parts 30b are provided on the upper side of a seat belt inserting hole 31, in the second embodiment, these protruding parts 30b may be saved, since the waving belt does not always slide on the protruding parts 30b.

Figure 10A:
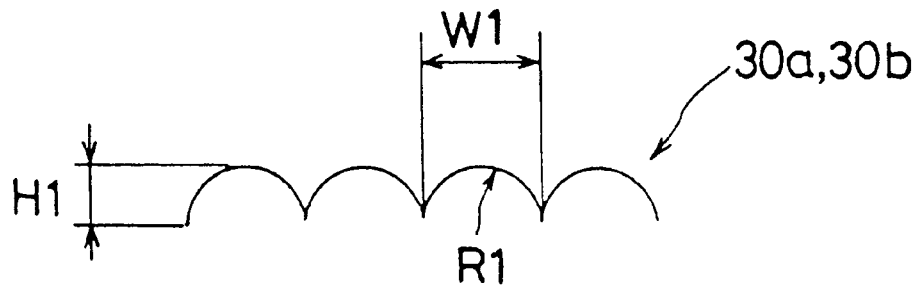
FIGS. 10A–10C show protruding parts formed on the seat belt hanging and holding member.

FIG. 10A shows an example of the sectional shape of the protruding parts 30a or 30b illustrated in FIG. 9A. The protruding parts 30a and 30b shown in the above example comprise a plurality of circular arc shaped protrusions adjacent to one another. The width W1 of each protruding part 30a or 30b is approximately 4 mm, the height H1 thereof is approximately 0.8 mm and the radius R1 of the circular arc is approximately 2 mm.

Figure 10B:
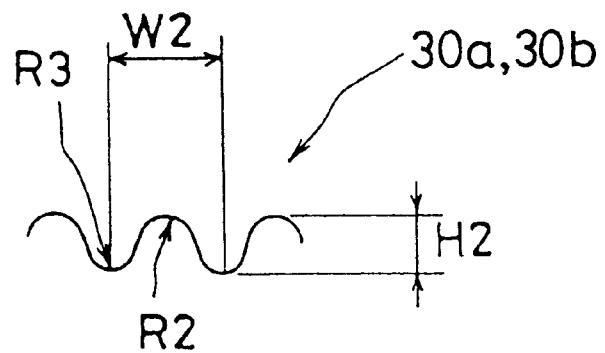

FIG. 10B shows an alternative example of the sectional shape of the protruding parts 30a and 30b shown in FIG. 9A. The protruding parts 30a-2 and 30b-2 illustrated in the present example comprise circular arc shaped crests and troughs which are alternately arranged. A pitch W2 from a trough to a trough is about 4 mm, height H2 is about 0.8 mm and each radius R2 or R3 of the crest or and the trough is about 1 mm.

Figure 10C:
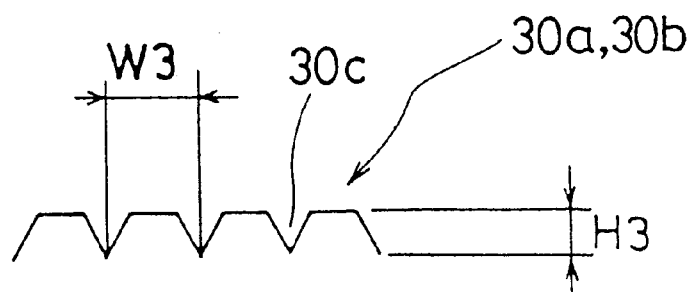

FIG. 10C shows a still another example of the sectional shape of the protruding parts 30a and 30b illustrated in FIG. 9A. The protruding parts 30a-3 and 30b-3 shown in the present example comprise a plurality of protrusions formed in trapezoidal shapes which are adjacent to one another. The width W3 of each protrusion 30a-3 or 30b-3 is about 4 mm, and the height H3 thereof is about 0.8 mm. These protruding parts 30a-3 and 30b-3 can be also formed by forming V-grooves 30c on the flat coating member 30.

As illustrated above, the protruding parts 30a and 30b are formed in the seat belt inserting hole 31 of the coating member 30, so that the contact area between the coating member 30 and the waving belt 74 is decreased, and therefore, a frictional force exerted on the waving belt 74 can be decreased. As a result, a resistance when the waving belt 74 moves in the slot 22 is reduced, and a lubricant such as an aromatic agent is hardly peeled off from the waving belt 74, so that there scarcely arises a failure to wind the waving belt on its retractor (not shown).

Further, since the protruding parts 30a and 30b are extended in the direction along which the waving belt 74 slides, the waving belt 74 is not suddenly biased to one side of the slot 22 even when the supply of the waving belt 74 is stopped upon collision of the automobile. Therefore, a large friction is not instantaneously generated between the waving belt 74 and the coating member 30, so that the temperature of a part between the waving belt 74 and the coating member 30 becomes high. Thus, the quality of the waving belt 74 is not deteriorated and a failure to wind the waving belt 74 on the retractor can be prevented from occurring.

Further, since both the protruding parts 30a and 30b or only the protruding parts 30a are provided on the coating member 30, dusts or the like drop into the groove parts between the protruding parts 30a, or between the protruding parts 30b. Thus, the part of the coating member 30 which abuts against the waving belt 74 is hardly stained and the generation of static electricity can be suppressed (if a static electricity eraser is added to the coating member 30, the generation of the static electricity can be still more suppressed). Accordingly, the waving belt 74 may easily move in the seat belt inserting hole 31. As a result, the waving belt 74 can be smoothly pulled out from the retractor, or wound on the retractor.

Figure 11:
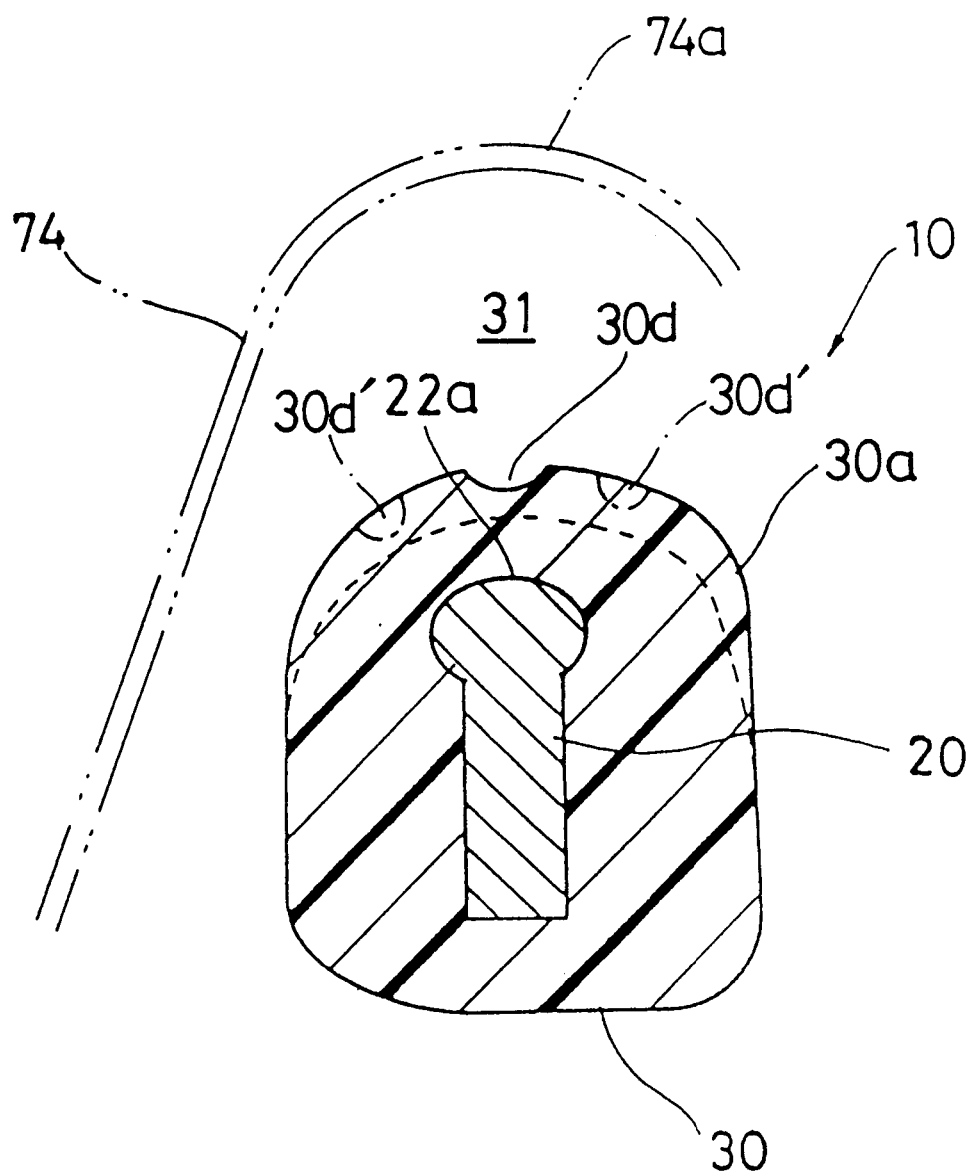
FIG. 11 shows a seat belt hanging and holding member illustrated as a first alternative example of the second embodiment and an enlarged sectional view of a position corresponding to the part B of FIG. 9B.

FIG. 11 shows a seat belt hanging and holding member illustrated as a first alternative example of the second embodiment and is an enlarged sectional view of a part corresponding to a part of the seat belt hanging and holding member 10 shown in FIG. 9B. On the coating member 30 illustrated in FIG. 11, an elongated groove 30d, is provided, which extends in the direction perpendicular to the extending direction of the protruding part 30a. Only a single groove 30d is provided in a part opposed to the folded-back part 74a of the waving belt 74 inserted into the seat belt inserting hole 31. In this case, a plurality of grooves 30d' may be provided in parallel with the groove 30d, as shown by dashed lines in FIG. 11. The above mentioned grooves 30d and 30d' can reduce the friction caused between the waving belt 74-and the coating member 30 made of a synthetic resin.

Figure 12A:
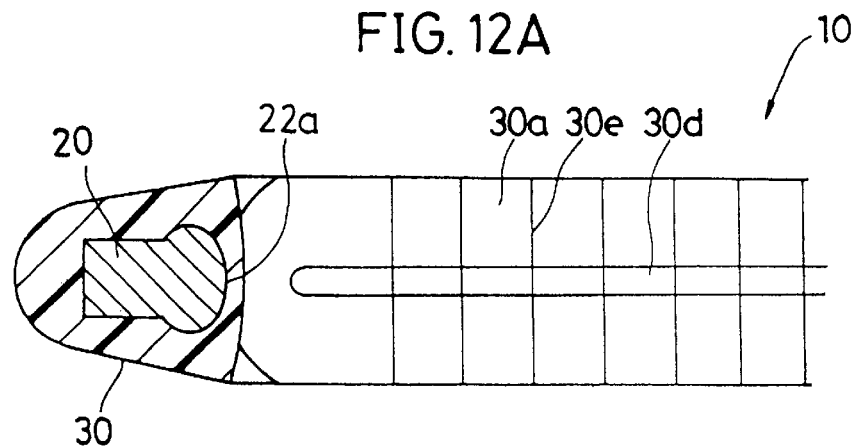
FIGS. 12A–12C show the seat belt hanging and holding member of the first alternative example.
Figure 12B:
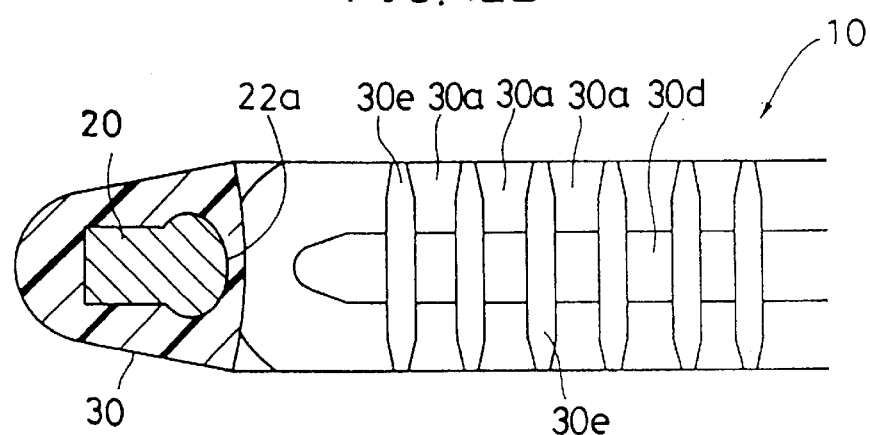
Figure 12C:
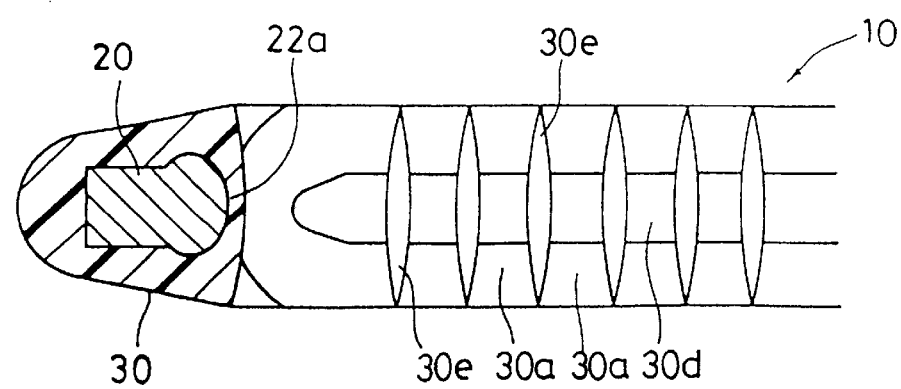

FIG. 12A shows a seat belt hanging and holding member 10 illustrated in FIG. 11 and is an enlarged sectional view of a part corresponding to a sectional view taken along a line 12A—12A of FIG. 9A. FIGS. 12B and 12C are enlarged sectional views showing examples in which the forms of grooves 30e, i.e. 30e-1, 30e-2, between the protruding parts 30a in FIG. 12A are modified, i.e. 30a-1 in FIG. 12B and 30a-2 in FIG. 12C.

Figure 13:
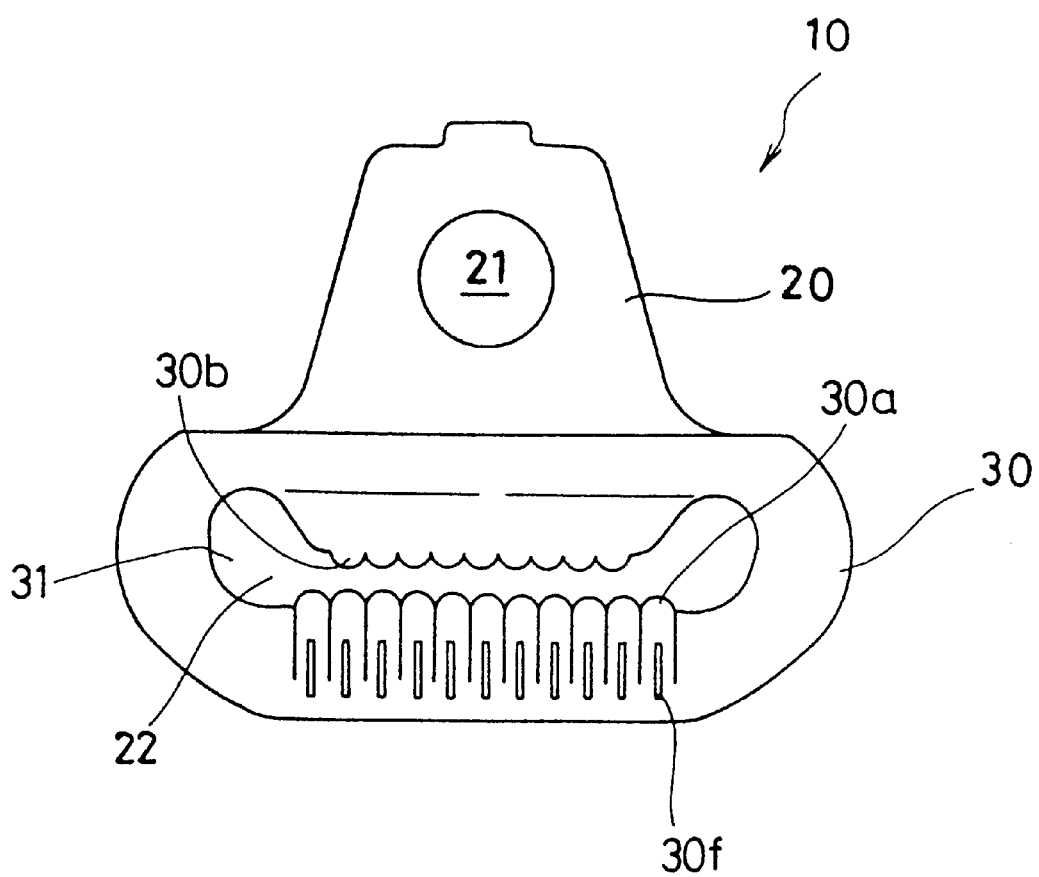
FIG. 13 is a front view of a seat belt hanging and holding member shown as a second alternative example of the second embodiment.

FIG. 13 shows the construction of a seat belt hanging and holding member 10 illustrated as a second alternative example of the second embodiment. The construction of the seat belt hanging and holding member 10 is substantially the same as that of the seat belt hanging and holding member 10 described in FIG. 9A. A difference therebetween resides only in that elongated grooves 30f are formed in the vicinity of both the end parts of the protruding parts 30a of the coating member 30 in their extending direction, and along the longitudinal direction of the waving belt 74. The elongated grooves 30f are also designed as a measure (referred to as a gum-up means) for lowering the friction between the waving belt 74 and the coating member 30.

Figure 14A:
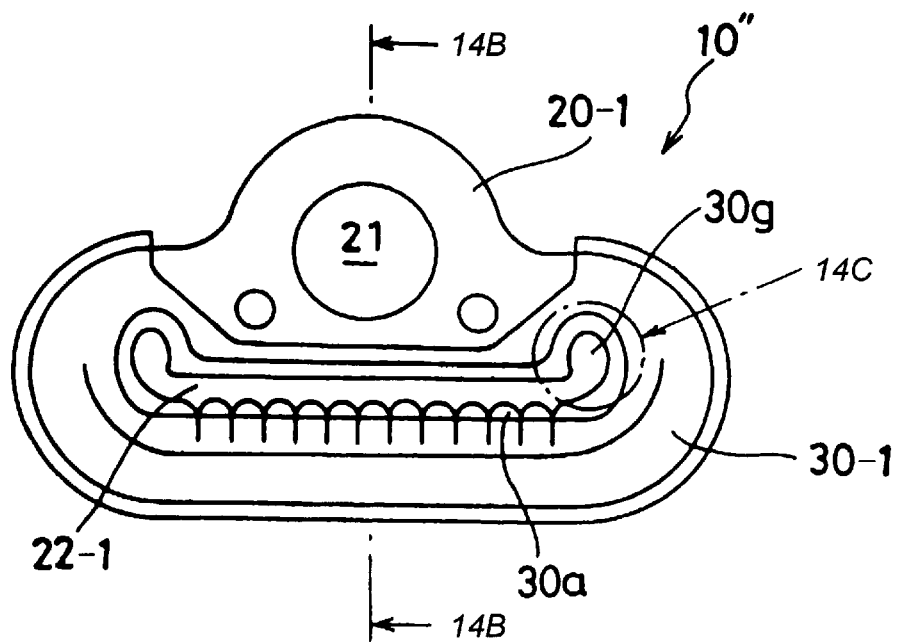
FIGS. 14A–14C show a seat belt hanging and holding member as a third alternative example of the second embodiment.
Figure 14B:
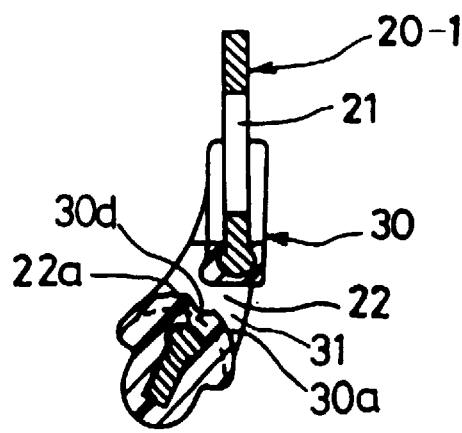

FIG. 14A is a front view of a seat belt hanging and holding member 10 illustrated as a third alternative example of the second embodiment. FIG. 14B is a sectional view taken along a line 14B—14B of FIG. 14A. In the third alternative example, the protruding parts 30b are not provided in the upper side of the seat belt inserting hole 31 and the protruding parts 30a are formed only in the lower side. Further, in the present example, the coating member 30-1 is formed substantially in a U shape so as to meet the shape of the slot 22-1 of the base member 20-1. In addition, as shown in FIG. 14B, a single groove 30d is provided in a part opposed to the folded-back part 74a (see FIG. 11) of the waving belt 74, in the lower side part of the seat belt-inserting hole 31.

Figure 14C:
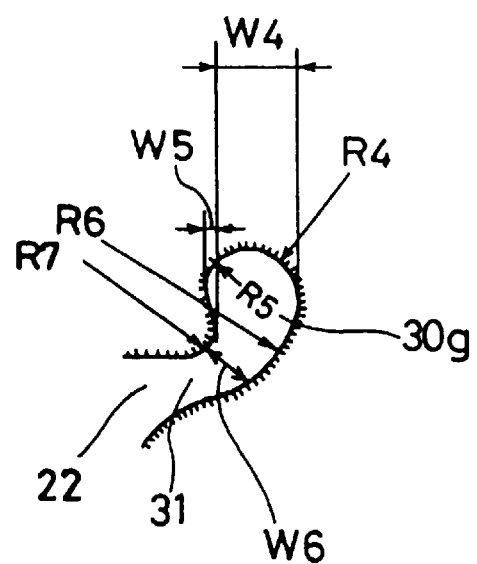

FIG. 14C is a partly enlarged view for explaining the shape of a part of FIG. 14A and describes specifically the shapes of recessed holes 30g respectively provided in the coating member 30 which correspond to both the end parts of the slot 22. The width W6 of the entrance part of the recessed hole 30g is 2 to 3 mm, the central width W4+W5 of the recessed hole 30g is approximately 7 mm, the radius R5 of the inside circular arc of the recessed hole 30g is about 6 mm, and the radius R6 of the outside circular arc of the recessed hole 30g is about 6 mm. Further, the radius R7 of an inside circular arc in the entrance part of the recessed hole 30g is about 7 mm.

Figure 15:
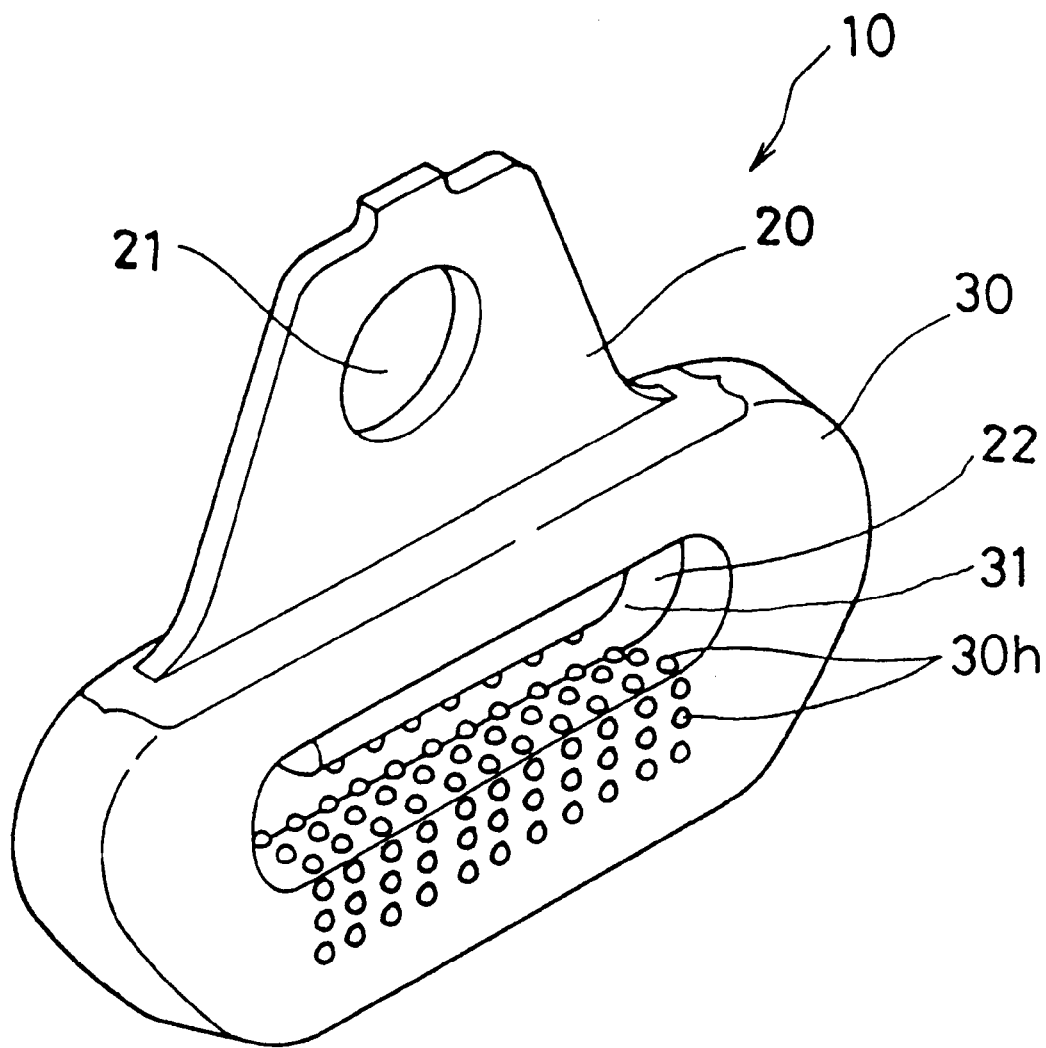
FIG. 15 is a perspective view of a seat belt hanging and holding member illustrated as a fourth alternative example of the second embodiment.

FIG. 15 is a perspective view of a seat belt hanging and holding member 10 illustrated as a fourth alternative example of the second embodiment. The same components as those of the seat belt hanging and holding member 10 of the second embodiment explained in FIG. 9A are affixed by the same reference symbols and the explanation thereof will be omitted. The seat belt hanging and holding member 10 of the fourth alternative example is different from the seat belt hanging and holding member 10 illustrated in FIG. 9A only in that a plurality of dome shaped protrusions 30h are successively arranged along the longitudinal direction of the waving belt 74, in the lower side part of the seat belt inserting hole 31, in place of a plurality of protruding parts provided along the longitudinal direction of the waving belt 74.

When a plurality of dome shaped protrusions 30h are successively arranged on the coating member 30 in such a manner, the contact area between the waving belt 74 and the coating member 30 can be similarly decreased and a friction to the waving belt 74 can be lowered. Consequently, resistance when the waving belt 74 moves in the seat belt inserting hole 31 is decreased, the aromatic agent is hardly separated from the waving belt 74 and a trouble to wind the belt on the retractor hardly arises. It is to be understood that the shape of the protrusion 30h is not limited to a spherical shape.

Figure 16:
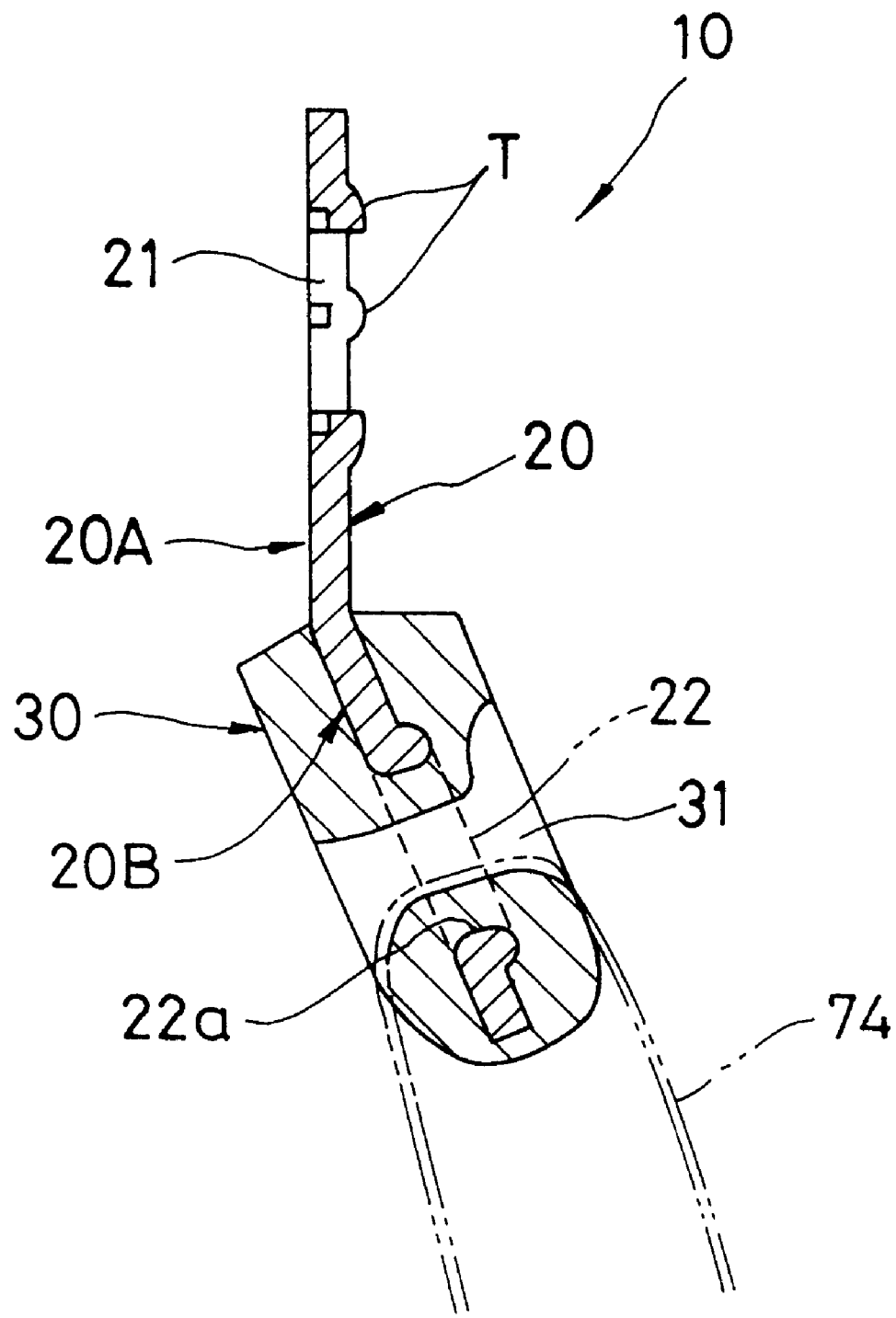
FIG. 16 shows a seat belt hanging and holding member illustrated as a third embodiment of the present invention and a sectional view of a position corresponding to the position taken along the line 1B—1B of FIG. 1.

Now, with reference to FIGS. 16 to 19, a third embodiment of the present invention will be described. Herein, components common to the first embodiment shown in FIGS. 1 to 8 are affixed by the same symbols as those employed in the first embodiment and the explanation thereof will be simplified. FIG. 16 shows a seat belt hanging and holding member 10 of the third embodiment of the present invention and a sectional view corresponding to a sectional view taken along a line 1B—1B of FIG. 1 and FIGS. 17 to 19 are explanatory views for explaining only processes different from the production processes shown in FIGS. 2 to 8. The third embodiment is different from the first embodiment in that the edge part 22a-1 protrudes only to one surface side of the seat belt holding part 20B.

Specifically stated, the edge part 22a-1 protrudes only to one surface side of the seat belt holding part 20B, and the side to which the edge part protrudes and the side to which the edge part does not protrude are similarly formed in a smoothly curved surface along the direction in which the waving belt 74 is deflected. In the present embodiment, the edge part 22a-1 is formed in the same shape throughout the periphery of the slot 22.

Figure 17:
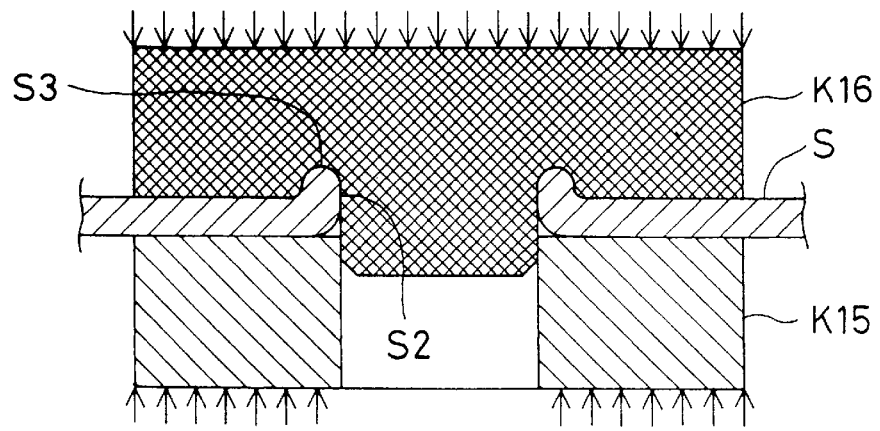
FIG. 17 is an explanatory view showing a fifth production process when the base member of the seat belt hanging and holding member is manufactured.
Figure 18:
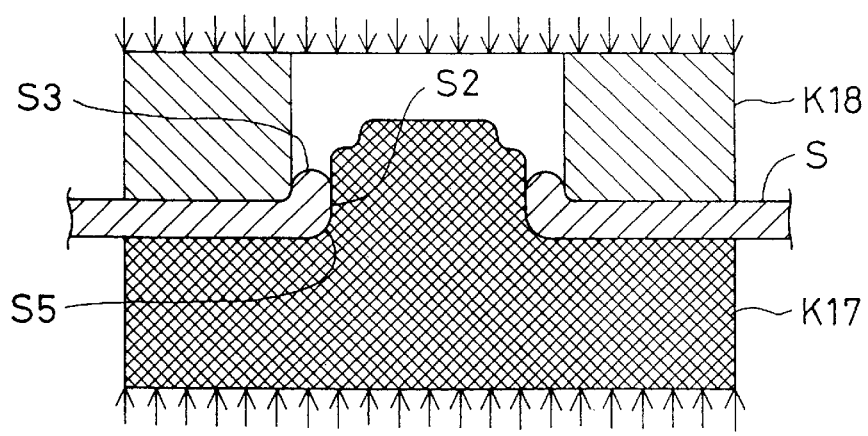
FIG. 18 is an explanatory view showing a sixth production process when the base member of the seat belt hanging and holding member is manufactured.
Figure 19:
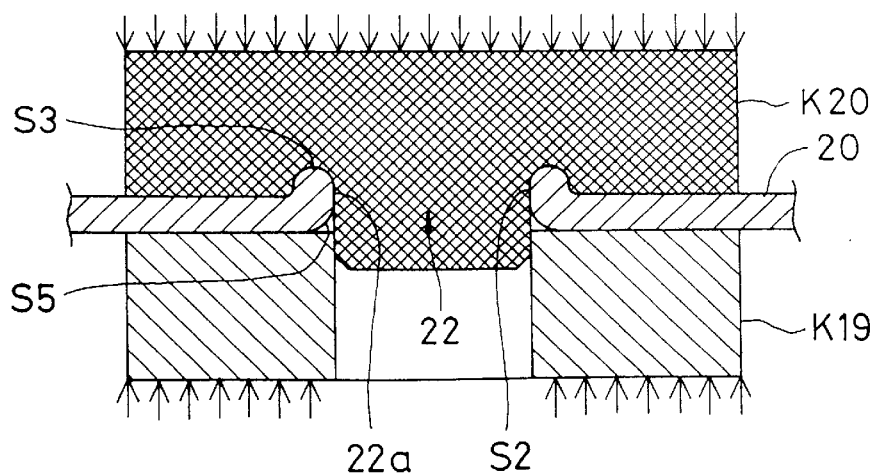
FIG. 19 is an explanatory view showing a seventh production process when the base member of the seat belt hanging and holding member is manufactured.

The seat belt hanging and holding member 10 constructed as described above is manufactured in accordance with processes illustrated in FIGS. 17 to 19. Preprocesses of FIG. 17 are common to the respective processes shown in FIGS. 2 to 5. Namely, the part of the first lower hole S1 is curved above the steel plate S in accordance with the fourth process shown in FIG. 5 so that the second lower hole S2 is formed. Then, in a fifth process shown in FIG. 17, the part of the second lower hole S2 protruding upward is face-pressed downward by using a lower metal mold K15 and an upper metal mold K16, so that a protruding part S3 protruding with a substantially constant height from the upper surface of the steel plate S is formed.

Further, in a sixth process as illustrated FIG. 18, an edge S5 opposite to the protruding part S3 protruding upward is machined so as to form a smoothly curved surface by employing a lower metal mold K17 and an upper metal mold K18. At this time, the surface of the second lower hole S2 is also neatly finished. Then, in a seventh process as illustrated in FIG. 19, the protruding part S3 protruding upward is finished so as to form an entirely smoothly curved surface by using a lower metal mold K19 and an upper metal mold K20. Also, at this time, the surface of the second lower hole S2 is cleanly finished. Thus, the slot 22 is formed by the second lower hole S2 finished in such a way. Still further, the edge part 22a-1 protrudes in the shape of a smoothly curved surface on the upper surface side of the steel plate S by means of the protruding part S3 and the edge S5.

The seat belt hanging and holding member 10 constructed as mentioned above exhibits similar operational effects to those of the first embodiment.

Figure 20A:
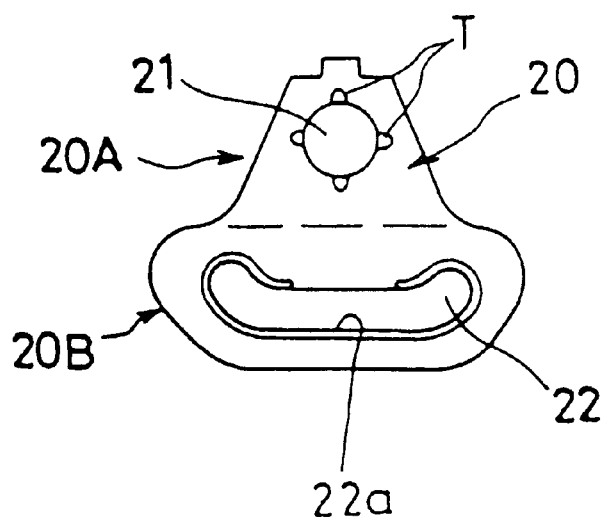
FIGS. 20A and 20b show an alternative example of the base member of the seat belt hanging and holding member.
Figure 20B:
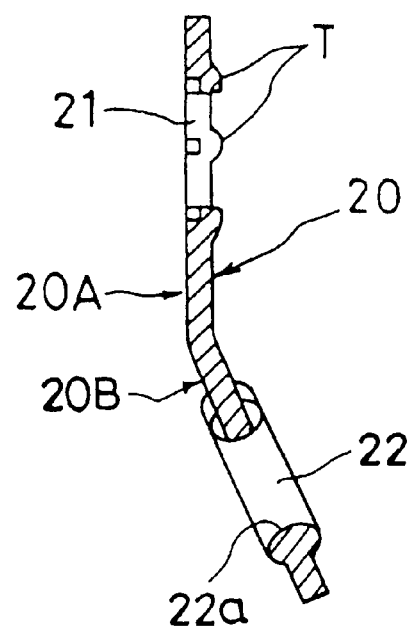

Although the edge part 22a-1 is formed so as to protrude in an elliptical shape in the first and second embodiments, the edge part 22a-1 may be formed so as to protrude in a circular shape or in other shapes of a smoothly carved surface. Additionally, although the edge part 22a-1 protruding in an elliptical shape is formed in all the periphery of the slot 22 in the above embodiments, it is to be noted that the edge part 22a-2 formed in such a fashion can be provided only in a position corresponding to a part on which the waving belt 74 is folded back (see FIG. 20A). Further, although the edge part 22a described in the third embodiment is also formed throughout the periphery of the slot 22, the edge part 22a may be provided only in a part on which the waving belt 74 is folded back (see 22a-2 of FIGS. 20A and 20B).

Next, referring to FIGS. 21A–21C, a fourth embodiment of the present invention will be described hereinafter. Herein, components common to those of the conventional example are affixed by the same reference symbols as those of the conventional example and the explanation thereof will be omitted.

Figure 21A:
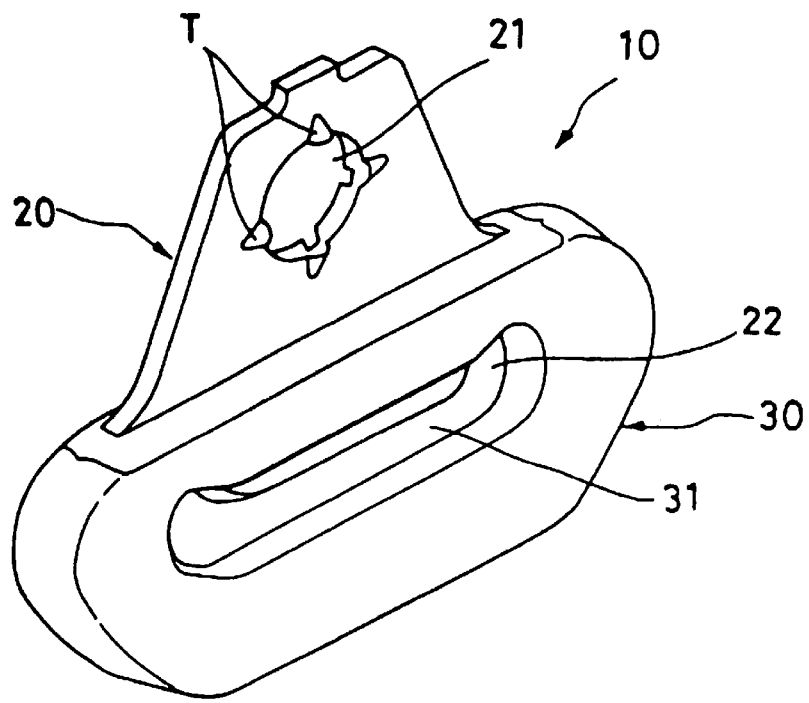
FIGS. 21A–21C show a seat belt hanging and holding member illustrated as a fourth embodiment of the present invention.

FIG. 21A is a perspective view showing the construction of a seat belt hanging and holding member 10 attached to the third anchor 73 of the center pillar 3 of the automobile, which has been described in FIG. 43A. FIG. 21B is a front view showing the base member 20 of the seat belt hanging and holding member 10. FIG. 21C is a sectional view taken along a line 21C—21C of FIG. 21B.

Figure 21B:
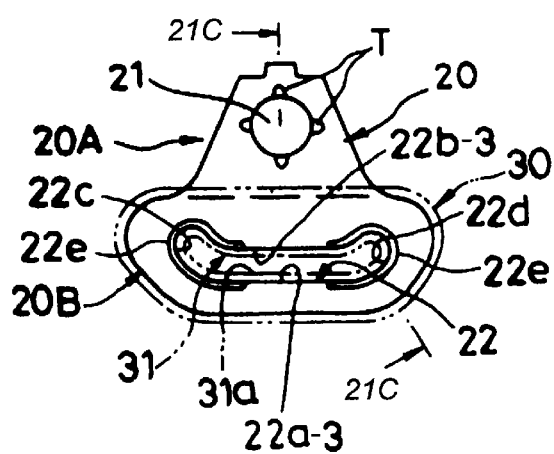
Figure 21C:
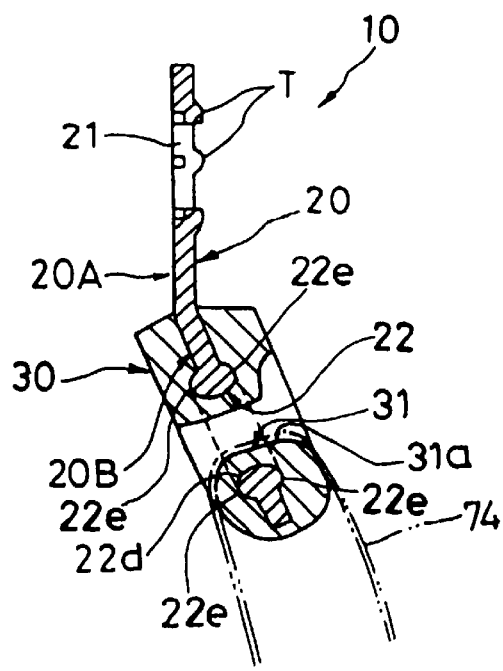

The seat belt hanging and holding member 10 is, as illustrated in the respective figures of FIG. 21, formed by inserting and molding a coating member 30 to the base member 20. The base member 20 is formed by punching out a steel plate (metal plate) material having thickness of 3 mm or thereabout and press-working it and comprises an attaching part 20A and a seat belt holding part 20B. The seat belt holding part 20B is, as illustrated in FIG. 21C, bent by a prescribed angle (about 30°) relative to the attaching part 20A. On the attaching part 20A, a bolt inserting hole 21 is opened. On the seat belt holding part 20B, the slot 22 is opened.

The slot 22 is, as shown in FIG. 21B, provided with long edge parts 22a-2 and 22b-3 opposed to each other and short edge parts 22a and 22d formed as a curved surface so as to be connected to both the end parts of these long edge parts 22a-3 and 22b-3. The respective long edge parts 22a and 22b are punched out substantially at right angles with the surface of the base member 20. Further, the short edge parts 22c and 22d are, as illustrated in FIGS. 21B and 21C, formed in an elliptical shape in section by protruding parts 22e respectively to one surface side and the other surface side of the base member 20.

Specifically stated, the short edge parts 22c and 22d are formed in the shape of a smoothly curved surface along the direction in which the waving belt 74 is deflected, by the protruding parts 22e which protrude toward one surface side and the other surface side of the base member 20. Additionally, in the present embodiment, the respective protruding parts 22e are also continuously formed at both the end parts of the long edge parts 22a-3 and 22b-3 which are adjacent to the short edge parts 22c and 22d. That is, the respective protruding parts 22e are formed in the parts to which the waving belt 74 is concentrically gathered when the waving belt 74 is abruptly pulled or the like.

Besides, the respective protruding parts 22e are formed in accordance with a cold-working method by bending a part of the base member 20 to one surface side, moving the bent part to the other surface side and shaping it in the shape of a curved surface. Accordingly, the respective protruding parts 22e extend a large amount from the base member 20 and are excellent in their strength.

The coating member 30 is formed in accordance with an insert-molding method so as to cover the periphery of the slot 22 of the base member 20 and has a part opened corresponding to the slot 22 which serves as a seat belt inserting hole 31. The seat belt-inserting hole 31 has a part along the long edge part 22a-3 remote from the bolt-inserting hole 31, which serves as a folding-back and sliding part 31a on which the waving belt 74 is folded back and slidingly supported.

Further, as illustrated in FIG. 21A, protrusions T protrude at prescribed intervals in the periphery of the bolt-inserting hole 21. These protrusions T serve as a rotation stopper of a bolt when the seat belt hanging and holding member 10 is attached to the anchor 73 (see FIG. 43A) of the center pillar 3 of the automobile by means of a bolt (not shown) and achieve the effect of a conventional washer. As a result, since an ordinarily used washer is not needed when the seat belt hanging and holding member 10 is attached to the anchor, the number of parts can be decreased.

In the seat belt hanging and holding member 10 constructed as described above, since the short edge parts 22c and 22d of the slot 22 and the end parts of the long edge parts 22a-3 and 22b-3 adjacent to them are formed in the shape of a smoothly curved surface along the direction in which the waving belt 74 is folded back, the stress concentration of the coating member 30 in contact with the short edge parts 22c and 22d, and the end parts of the long edge parts 22a and 22b can be extremely reduced. Therefore, even when the waving belt 74 gathers to, for example, the short edge 22c side of the slot 22, a force exerted on the coating member 30 from the short edge part 22c can be distributed. Thus, the force exerted on the coating member 30 from the base member 20 can be reduced.

Further, since the protruding parts 22e are formed in the short edge parts 22c and 22d, and the end parts of the long edge parts 22a-3 and 22b-3 adjacent thereto, a face pressure acting on the coating member 30 from the short edge parts 22c and 22d and the end parts of the long edge parts 22a-3 and 22b-3 can be decreased. Therefore, the force exerted on the coating member 30 from the base member 20 can be still more decreased.

Figure 22:
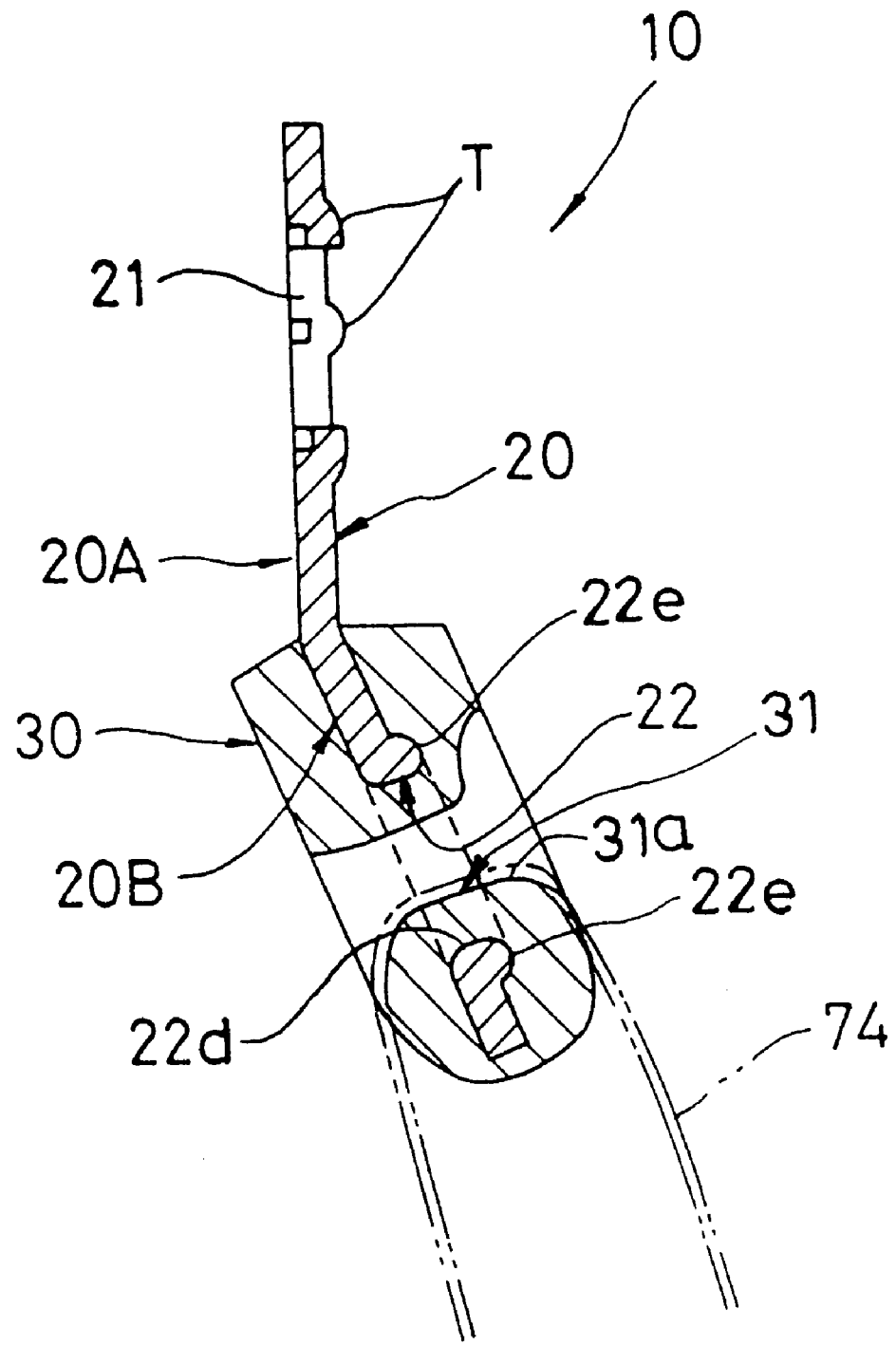
FIG. 22 shows a seat belt hanging and holding member illustrated as a fifth embodiment of the present invention, and a sectional view corresponding to the sectional position taken along the-line 21C—21C of FIG. 21B.

Now, a fifth embodiment of the present invention will be described, with reference to FIG. 22. Herein, components common to those of the fourth embodiment seen in FIGS. 21A–21C are affixed by the same reference symbols as those of FIGS. 21A–21C and the explanation thereof will be omitted. The fifth embodiment is different from the fourth embodiment in that protruding parts 22e-1 extend only to one surface side of the base member 20.

The above mentioned protruding parts 22e-1 are, similar to the fourth embodiment, formed so as to be connected from both the end parts of the long edge parts 22a-3 and 22b-3 to the whole parts of the short edge parts 22c and 22d. The parts having the protruding parts 22e are formed in the shape of a smoothly curved surface along the direction in which the waving belt 74 is deflected. The protruding parts 22e-1 are formed in accordance with a cold-working method by bending a part of the base member 20 to one surface side and shaping the bent part in a curved surface. Thus, the protruding parts 22e-1 extend a large amount from the base member 20 and is excellent in view of strength.

The seat belt hanging and holding member 10 constructed as stated above also attains similar operational effects to those of the fourth embodiment.

Although, in the fourth and fifth embodiments, the protruding parts 22e-1 are formed on the short edge parts 22c and 22d or the end parts of the long edge parts 22a-3 and 22b-3 continued thereto to which the waving belt 74 concentrically comes together when the waving belt 74 is suddenly pulled or the like, it is to be noted that the short edge parts 22c and 22d or the end parts of the long edge parts 22a-3 and 22b-3 connected thereto can be formed in the shape of a smoothly curved surface simply along the direction in which the waving belt 74 is folded back without providing the protruding parts 22e-1 in this way. In this case, since the radius of curvature of the curved surface is decreased, when the swelling parts 22e are not provided, the stress concentration of the coating member 30 coming into contact with the short edge parts 22c, 22d or the like is increased. Besides, a face pressure acting on the coating member 30 from the short edge parts 22c, 22d or the like is also increased. Therefore, it is desirable to provide the protruding parts 22e on the short edges 22c, 22d or the like.

It is also apparent that the short edges 22c and 22d or the end parts of the long edge parts 22a-3 and 22b-3 may not be provided with-the protruding parts 22e-1 nor be formed in the shape of a curved surface in a part to which the waving belt 74 does not concentrically gather.

Now, referring to FIGS. 23A–23C, a sixth embodiment of the present invention will be described below. Herein, components common to those of a conventional example illustrated in FIGS. 43A–43C and 47 are affixed by the same reference symbols as those in these figures and the explanation thereof will be omitted.

Figure 23A:
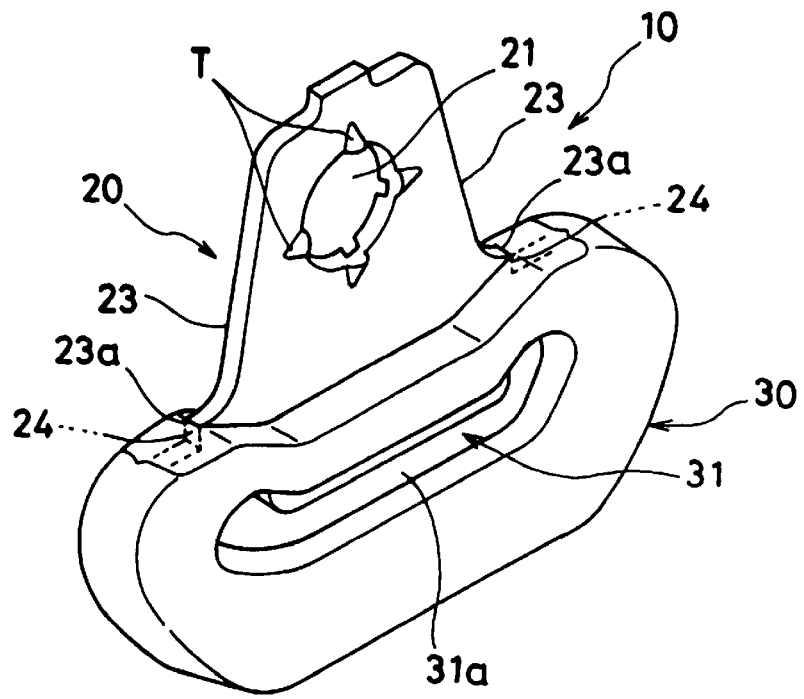
FIGS. 23A–23C show a seat belt hanging and holding member illustrated as a sixth embodiment of the present invention.
Figure 43B:
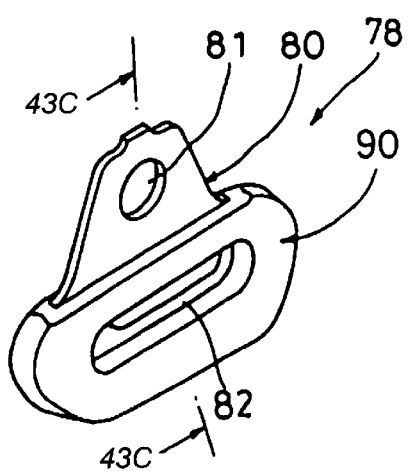
Figure 43C:
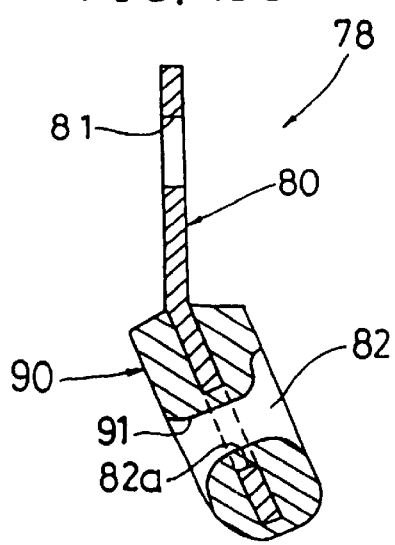
Figure 44:
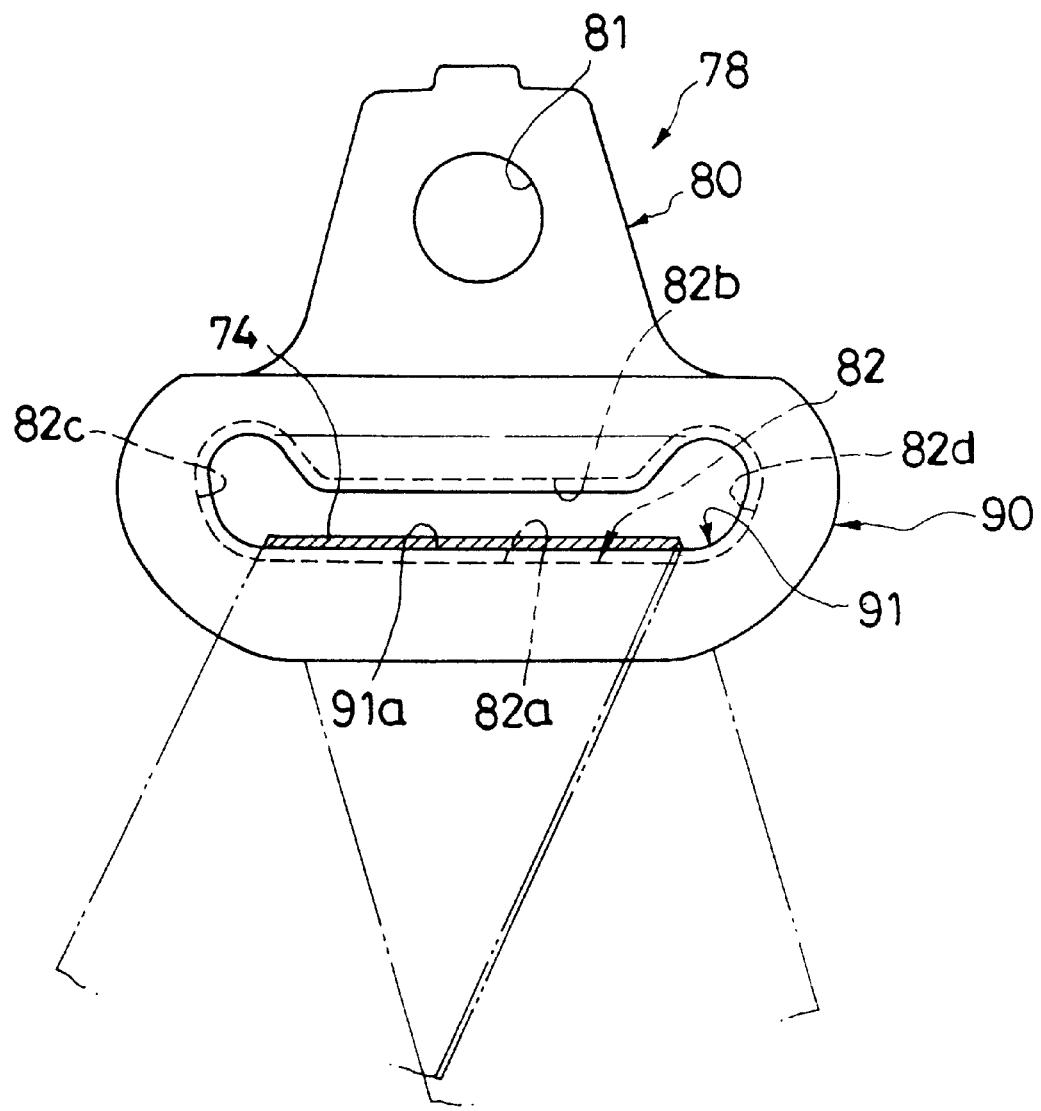
FIG. 44 is a front view showing a conventional seat belt hanging and holding member.
Figure 45:
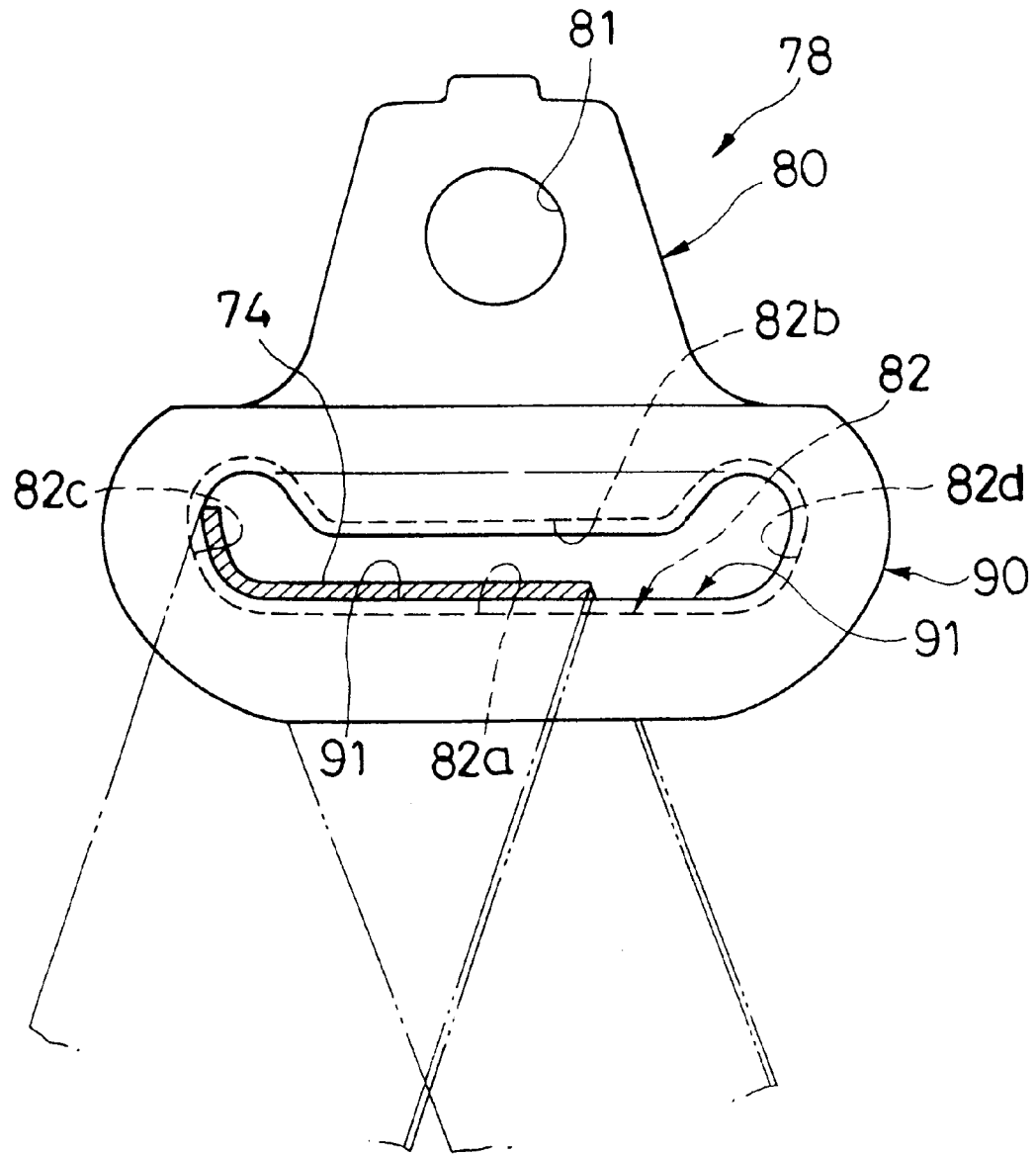
FIG. 45 is an explanatory view showing the problem of the above seat belt hanging and holding member.
Figure 46:
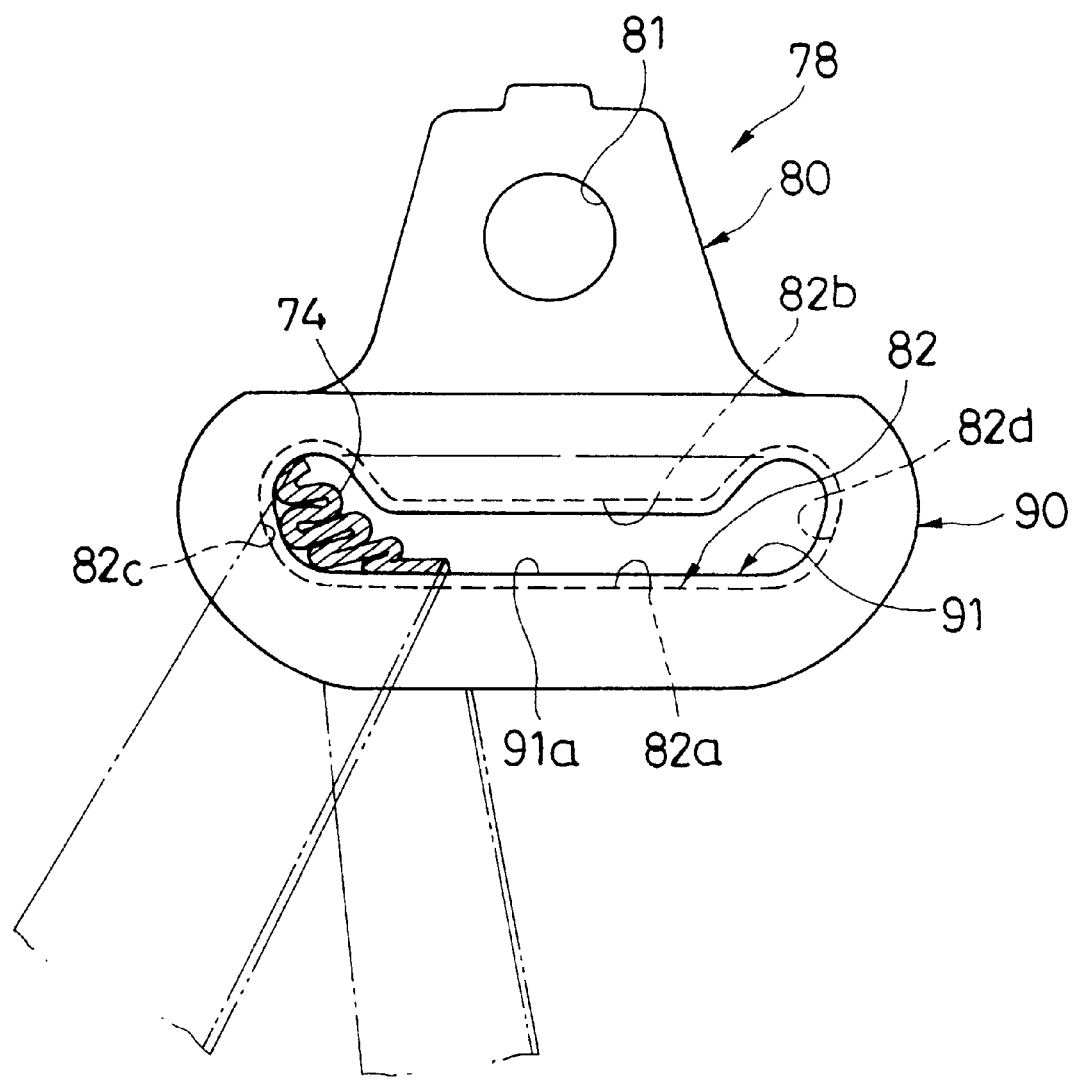
FIG. 46 is an explanatory view showing the problem of the above described seat belt hanging and holding member.
Figure 47:
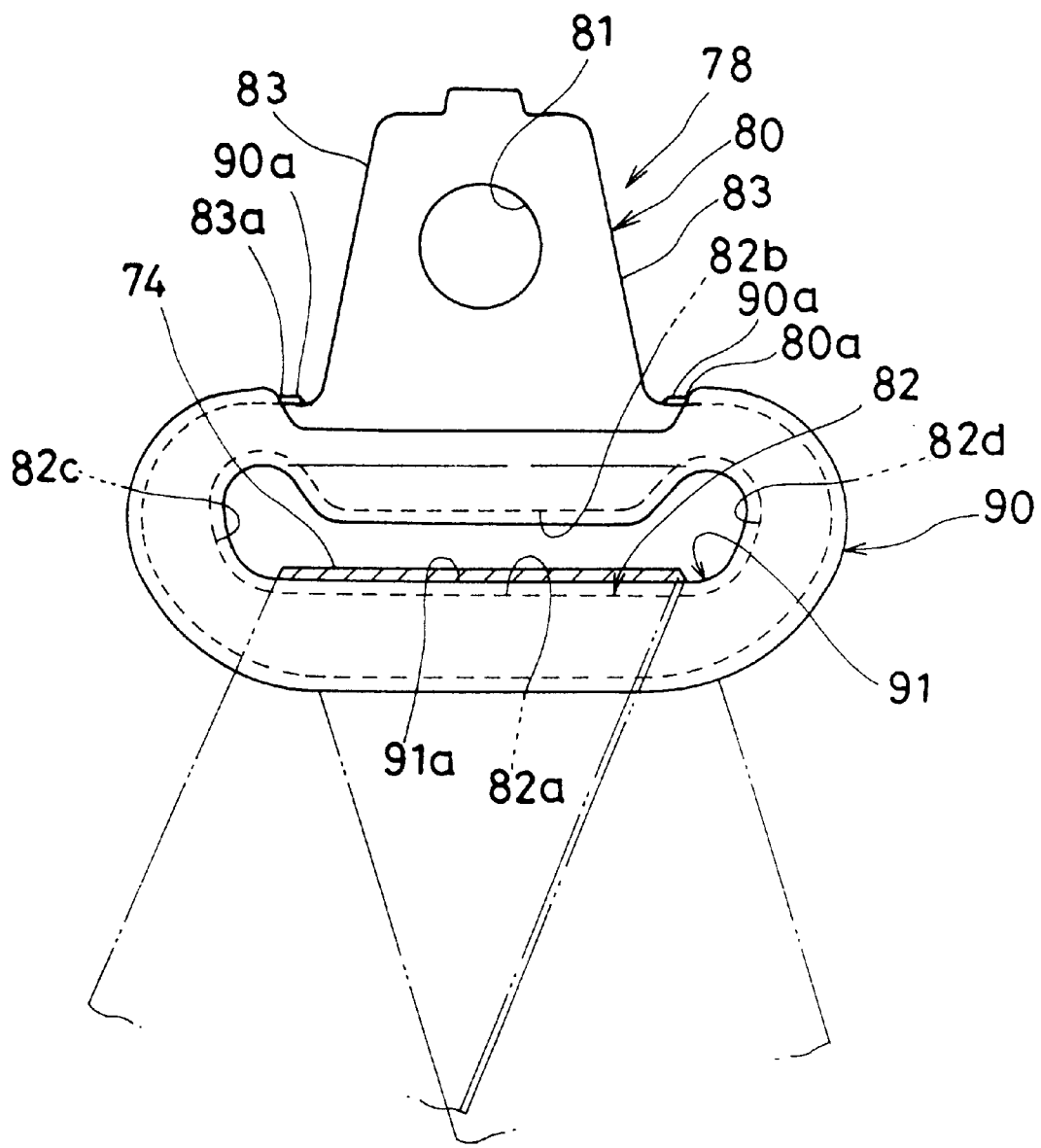
FIG. 47 is a front view of a seat belt hanging and holding member illustrated as an alternative conventional example.

FIG. 23A is a perspective view showing the construction of a seat belt hanging and holding member 10 attached to the third anchor 73 described in connection with FIG. 43B. FIG. 23B is a front view showing the base member 20 of the seat belt hanging and holding member 10. FIG. 23C is a sectional view of the seat belt hanging and holding member 10 taken along a line 23C—23C of FIG. 23B.

Figure 23B:
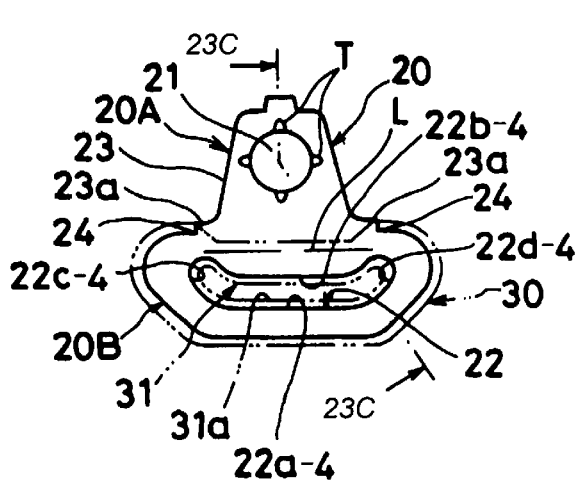
Figure 23C:
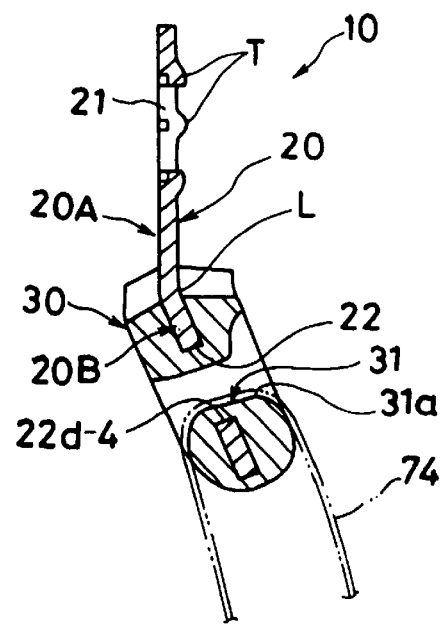

The seat belt hanging and holding member 10 is, as illustrated in FIGS. 23A to 23C, by inserting and molding (injection molding) the coating member 30 to the base member 20. The base member 20 is formed by punching out a steel plate (metal plate) material having thickness of 3 mm or thereabout and press-working it and comprises an attaching part 20A and a seat belt holding part 20B. The attaching part 20A and the seat belt holding part 20B are, as seen in FIG. 23C, bent by prescribed angle (about 30°) with respect to a bending part L. As illustrated in FIG. 23B, a bolt-inserting hole 21 is opened on the attaching part 20A, and a slot 22 into which the waving belt (seat belt) 74 is inserted is opened on the seat belt holding part 20B.

The slot 22 comprises linear long edge parts 22a-4 and 22b-4 opposed to each other and curved short edge parts 22c-4 and 22d-4 formed so as to connect together both the end parts of the long edge parts 22a-4 and 22b-4. The slot 22 comprising the respective long edge parts 22a-4 and 22b-4, and the respective short edge parts 22c-4 and 22d-4 is, as seen in FIG. 23C, punched out substantially at right angles with the surface of the base member 20.

The coating member 30 is inserted and molded to the base member 20 so as to cover the periphery of the slot 22 of the base member 20 and has a seat belt-inserting hole 31 opened at a part corresponding to the slot 22. Further, the seat belt inserting hole 31 is provided with a part along the long edge part 22a-4 located in the side remote from the bolt-inserting hole 21 as a folding back and sliding part 31a for folding back and slidingly supporting the waving belt 74.

As illustrated in FIGS. 23A to 23C, protrusions T protrude at prescribed pitches in the periphery of the bolt inserting hole 21. These protrusions T serve as a rotation stopper of a bolt (not shown) when the seat belt hanging and holding member 10 is attached to the third anchor 73 (see FIG. 43A) of the center pillar 3 of the automobile by means of a bolt and exhibits the effect of a conventional washer. Consequently, when the seat belt hanging and holding member 10 is attached to the anchor, an ordinarily employed washer is not required, so that the number of parts can be decreased.

Additionally stated, the base member 20 is, as seen in FIGS. 23A to 23B, provided with a step part 24 formed so as to be lower by one step than an outer peripheral edge part 23 in the boundary part 23a between the outer peripheral edge part 23 and the coating member 30. The step part 24 is formed substantially at right angles with the outer peripheral edge part 23, and so as to have such a height that the surface of the coating member 30 is substantially flush with the surface of the outer peripheral edge part 23. In other words, the outer peripheral edge part 23 of the base member 20 has a part, located in the coating member 30 side, which is formed lower by the thickness of the coating member 30 by providing the step part 24.

In the seat belt hanging and holding member 10 constructed as mentioned above, the base member 20 is initially inserted into a metal mold, and then, the metal mold is closed. Then, a space corresponding to the coating member 30 in the metal mold is injection-filled with a resin. Thus, the coating member 30 is molded integrally with the base member 20. The coating member 30 is formed integrally with the base member 20 in accordance with a so-called insert-molding method.

Since the outer peripheral edge part 23 of the base member 20 is provided with the step part 24 set lower by one step in the coating member 30 side, the resin can be prevented, upon insert-molding, from leaking along the outer peripheral edge 23 from the boundary part 23a. Accordingly, burs formed with the coating member 30 can be prevented from being produced in the boundary part 23a between the base member 20 and the coating member 30.

Besides, although the leakage of the resin as mentioned above has been conventionally prevented by setting a metal closing force to a high level, the metal closing force does not need to be set to such a high level, since the leakage of the resin can be prevented as stated above. Thus, the durability of the metal mold can be improved.

Now, referring to FIGS. 24A to 26, a seventh embodiment of the present invention will be described. Herein, components common to those shown in the sixth embodiment are affixed by the same reference symbols as those in the sixth embodiment and the explanation thereof will be omitted. The seventh embodiment is different from the sixth embodiment in that the end parts of a slot 22 in its longitudinal direction protrude to one surface side and the other surface side of the base member and are formed in the shape of a smoothly curved surface along the direction in which the waving belt 74 (seat belt) is deflected.

Figure 24A:
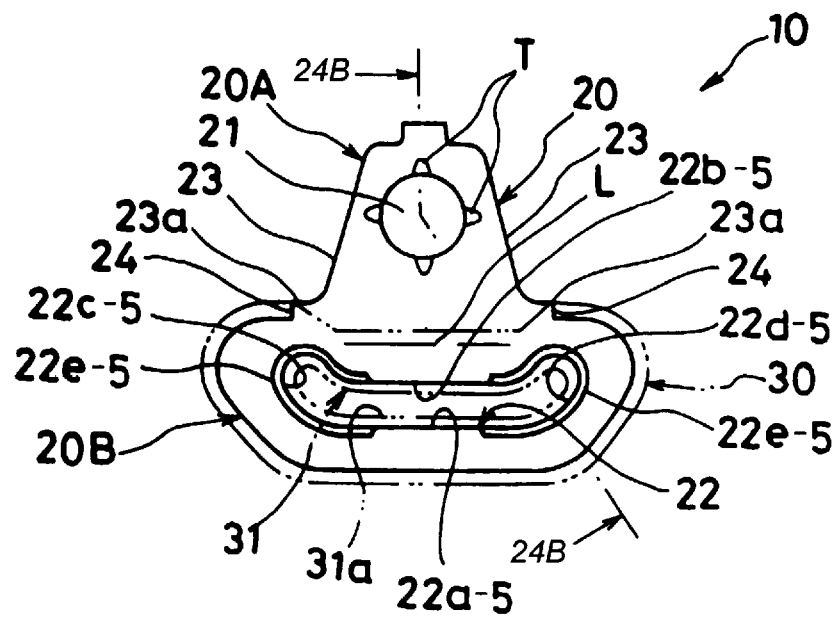
FIG. 24A and 24b show a seat belt hanging and holding member illustrated as a seventh embodiment of the present invention.
Figure 24B:
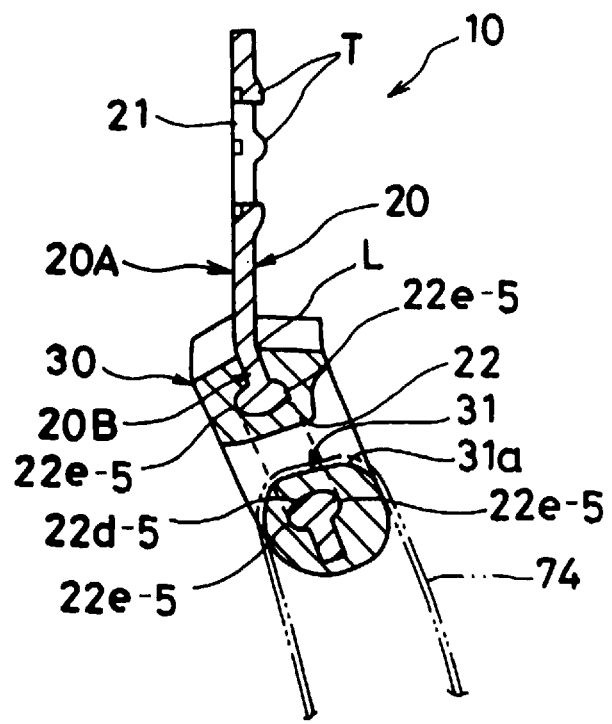

Specifically stated, short edge parts 22c-5 and 22d-5 are, as illustrated in FIGS. 24A and 24B, formed in an elliptical shape in section by forming protruding parts 22e which respectively extend to one surface side and the other surface side of the base member 20.

Figure 26:
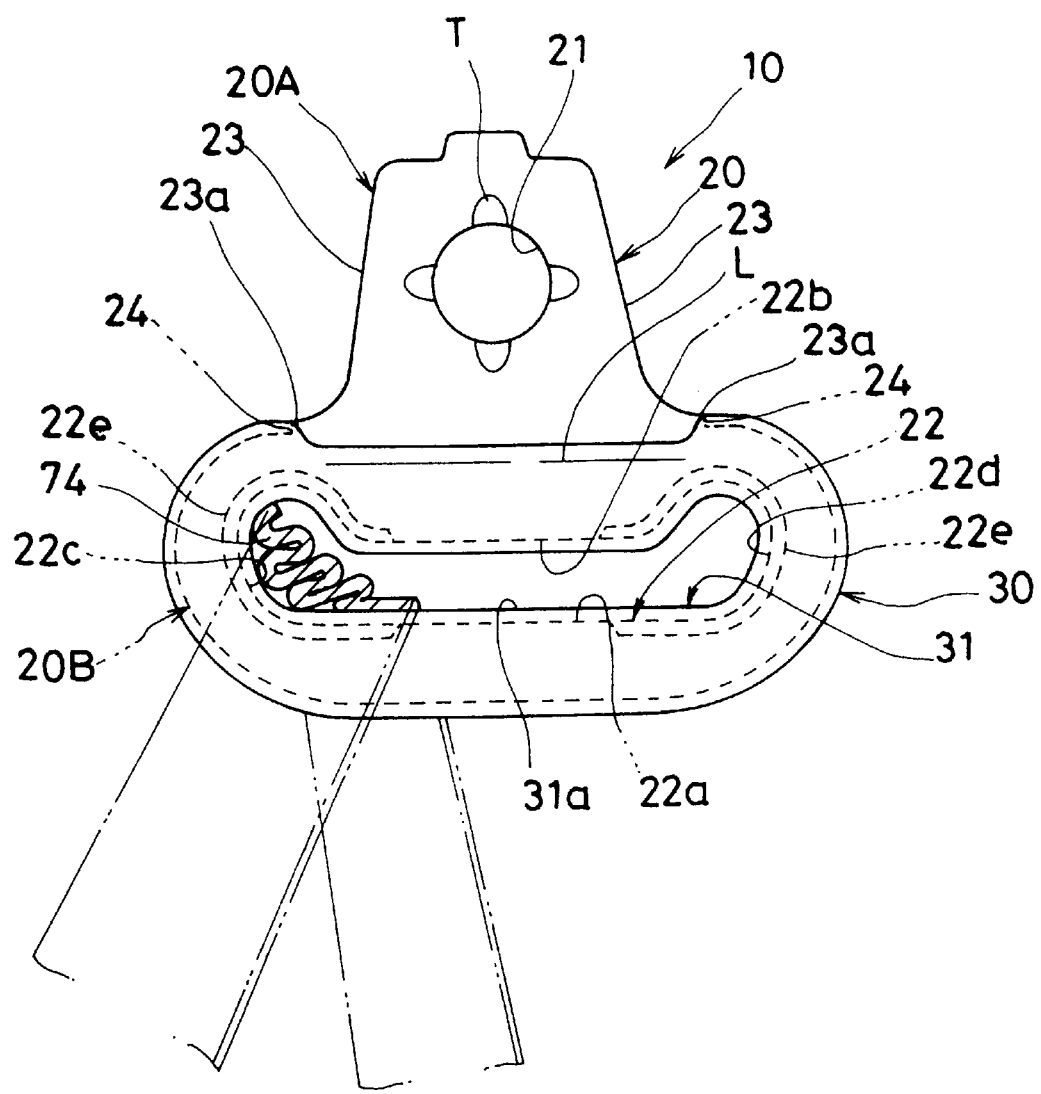
FIG. 26 is a front view showing the operational effect of the seat belt hanging sling and holding member.

Further, in the present embodiment, the respective protruding parts 22e-5 are continuously formed similarly at both the end parts of long edge parts 22a-5 and 22b-5 adjacent to the short edge parts 22c-5 and 22d-5. That is, the respective swelling parts 22e are, as seen in FIG. 26, formed on the end parts of the slot 22 to which the waving belt 74 is concentrically gathered, for example, when the waving belt 74 is abruptly pulled or the like.

The respective protruding parts 22e-5 are formed in accordance with a cold-working method by bending a part of the base member 20 to one surface side, moving the bent part to the other surface side and shaping it in a curved surface. Accordingly, the respective protruding parts 22e-5 from the base member 20 and are excellent in view of strength.

Figure 25:
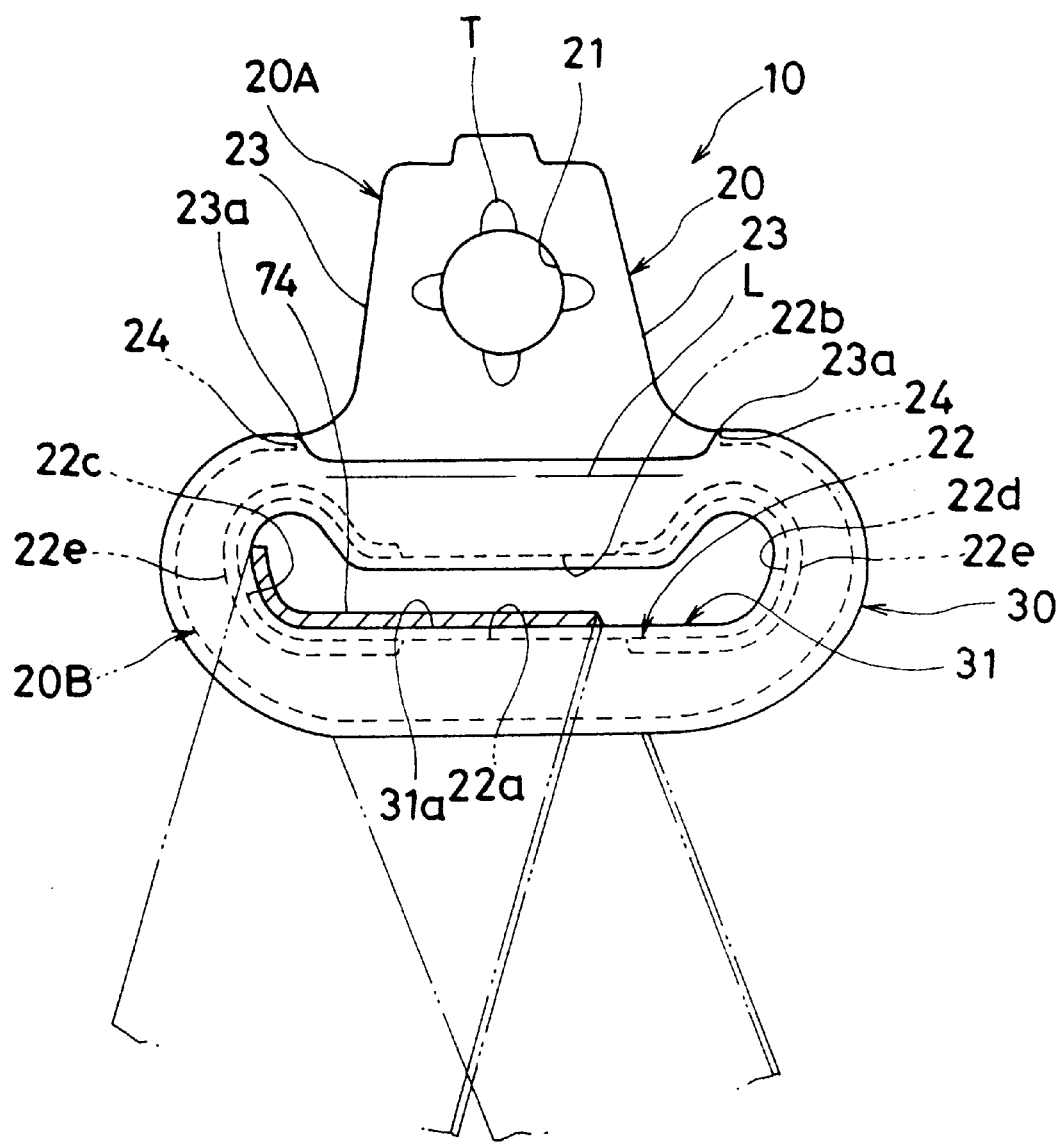
FIG. 25 is a front view showing the operational effect of the seat belt hanging and holding member.

The seat belt hanging and holding member 10 constructed as mentioned above is formed so as to form the base member 20 integrally with the coating member 30 in accordance with an insert-molding method similar to the sixth embodiment. In addition, for example, when the waving belt 74 is suddenly pulled or the like, the waving belt 74 may slip to one short edge part 22c-5 side (or the other short edge part 22d-5 side), as shown in FIG. 25, or concentrically come to one short edge part 22c-5 side (or the other short edge part 22d-5 side), as shown in FIG. 26. In this case, the force of the waving belt 74 is concentrically exerted on one short edge part 22c-5 side.

However, since the short edge parts 22c-5 and 22d-5, and the end parts of the long edge parts 22a-5 and 22b-5 adjacent thereto are formed in the shape of a smoothly curved surface by providing the protruding parts 22e-5, an extremely small stress concentration is only produced in the coating member 30 coming into contact with these short edge parts 22c-5, 22d-5 or the like. Therefore, if the force of the waving belt 74 concentrically gathers to, for example, one short edge part 22c-5 side of the slot 22, the force applied to the coating member 30 from the one short edge 22c-5 side will be distributed and not be concentrated to one part. Thus, the strength of the coating member 30 can be increased without increasing the thickness or strength of a resin.

Further, since the contact area between the short edge parts 22c-5, 22d-5 or the like and the coating member 30 is increased by providing the protruding parts 22e-5, a face pressure exerted on the coating member 30 from the short edge parts 22c-5, 22d-5 or the like can be decreased. Therefore, with the above described matter taken into consideration, if the force of the waving belt 74 is concentrically gathered to the one short edge part 22c-5 side, the force applied to the coating member 30 from the base member 20 can be reduced. That is, the strength of the coating member 30 can be increased without increasing the thickness or strength of the resin.

If the force of the waving belt 74 should concentrically gather to, for example, the one short edge part 22c-5 side, so that the coating member 30 would be broken, the waving belt 74 would come into contact with the one short edge part 22c-5 or the like and then it would not be broken thereby, since the one short edge part 22c-5 or the like is formed in the shape of a smoothly curved surface along the direction in which the waving belt 74 is folded back by forming the protruding part 22e. Besides, the seventh embodiment achieves similar operational effects to those of the sixth embodiment.

Additionally stated, in the present embodiment, the position of the above described bending part L is, as seen in FIGS. 24A to 26, a position evading the protruding parts 22e formed in the short edge parts 22c-5 and 22d-5. Accordingly, when the base member 20 is bent by a prescribed angle with respect to the bending part L, it can be bent with a pressing force equal to that of the sixth embodiment. This is the case in other embodiments described above and below.

Figure 27:
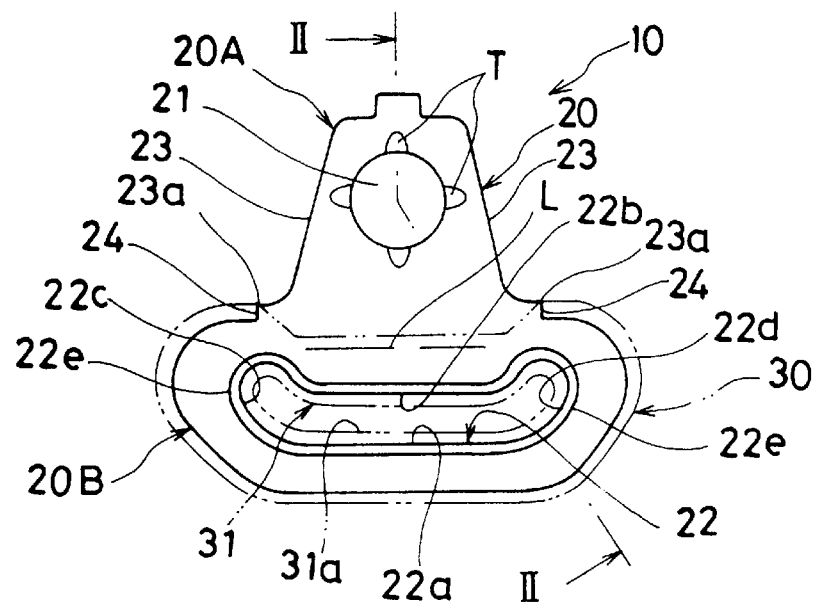
FIG. 27 shows a seat belt hanging and holding member illustrated as a eighth embodiment of the present invention and is a front view showing a base member.

Next, an eighth embodiment of the present invention will be described by referring to FIG. 27. Herein components common to those of the seventh embodiment seen in FIGS. 24A to 26 are affixed by the same reference symbols as those in these figures and the explanation thereof will be omitted. The difference between the eighth embodiment and the seventh embodiment resides in that a protruding part 22e is provided throughout the entire periphery of a slot 22.

Namely, in the slot 22, the protruding part 22e-6 similar to that illustrated in FIG. 24B is formed on one surface side and the other surface side of the base member 20 throughout all the peripheries of the long edge parts 22a-5 and 22b-5 and the short edge parts 22c-5 and 22d-5.

According to the seat belt hanging member 10 constructed as described above, since the whole part of the slot 22 comes into smooth contact with the coating member 30, a stress concentration can be decreased in all the parts of the coating member 30 in contact with the slot 22. Further, since a face pressure can be lowered in all the parts where the slot 22 comes into contact with the coating member 22 by forming the protruding part 22e. Therefore, strength can be improved, because of reasons the same as those of the seventh embodiment, in all the parts of the coating member 30 along the slot 22. Additionally, if the coating member 30 should be broken, the waving belt 74 could be prevented from being damaged as a result of its abutting against the slot 22, since the whole part of the slot 22 is formed in the shape of a smoothly curved surface along the direction in which the waving belt 74 is folded back. Besides, the eighth embodiment exhibits operational effects similar to those-of the sixth and seventh embodiments.

Figure 28:
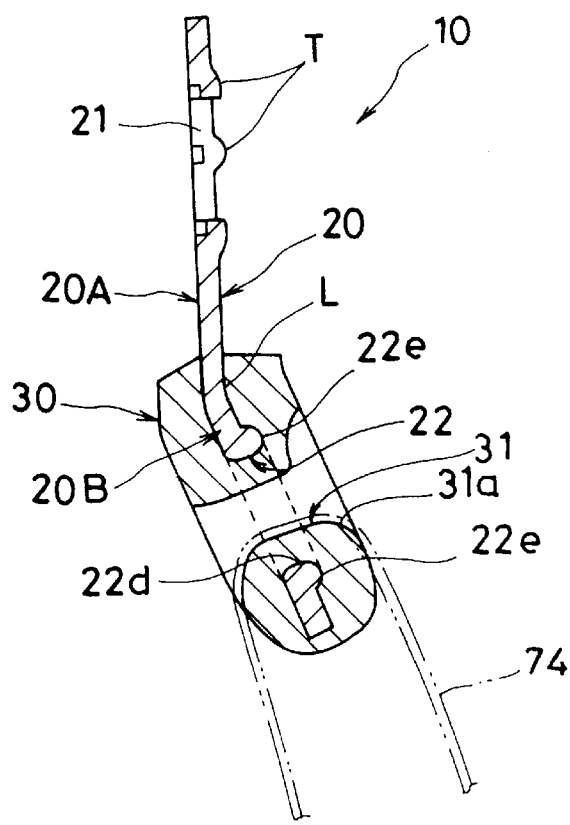
FIG. 28 is a sectional view of a seat belt hanging and holding member illustrated as a ninth embodiment of the present invention.

Now, referring to FIG. 28, a ninth embodiment of the present invention will be described hereinafter. Herein, components common to those of the seventh and eighth embodiments shown in FIGS. 24A to 27 are affixed by the same reference numerals as those of the above embodiments and the explanation thereof will be omitted. The ninth embodiment is different from the seventh and eighth embodiments in that the end parts of the slot 22 in its longitudinal direction or the whole periphery of the slot 22 extend to one surface side of the base member 20 and are formed in the shape of a smoothly curved surface along the direction in which the waving belt (seat belt) 74 is deflected.

That is, the short edge parts 22c-5 and 22d-5 and the long edge parts 22a-5 and 22b-5 adjacent thereto, of the slot 22, or the whole periphery of the slot 22 are provided with the protruding parts 22e-1 protruding merely to one surface side of the base member 20. The parts provided with the protruding parts 22e-1 are formed so as to have smoothly curved surfaces along the direction in which the waving belt 74 is folded back. Further, the protruding parts 22e-1 are formed in accordance with a cold-working method by bending a part of the base member 20 to one surface side and shaping the bent part in a curved surface. Accordingly, the protruding parts 22e extend a large amount from the base member 20 and are excellent in their strength.

The seat belt hanging and holding member 10 constructed as mentioned above achieves operational effects similar to those of the sixth to eighth embodiments.

Figure 29:
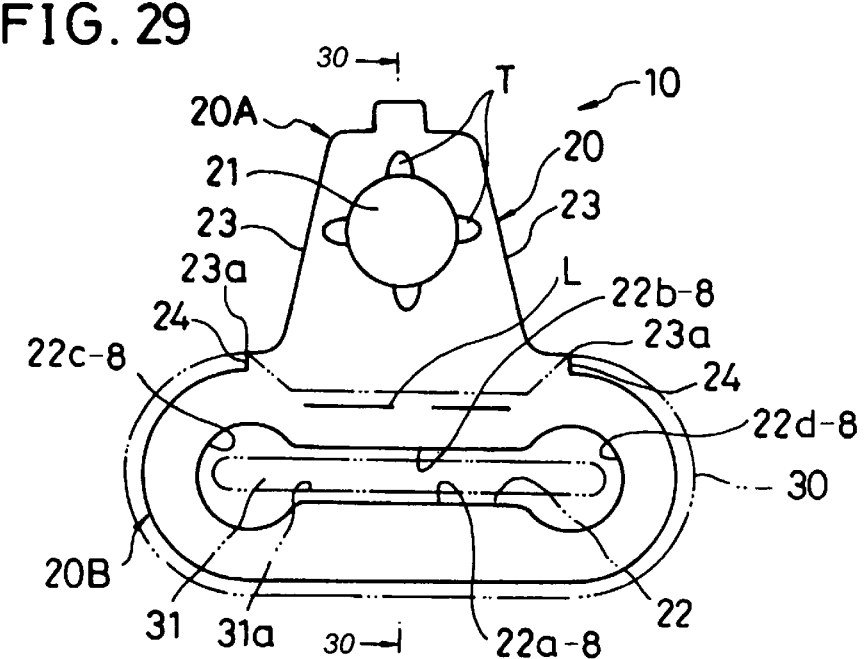
FIG. 29 is a front view showing a base member of a seat belt hanging and holding member illustrated as a tenth embodiment of the present invention.
Figure 30:
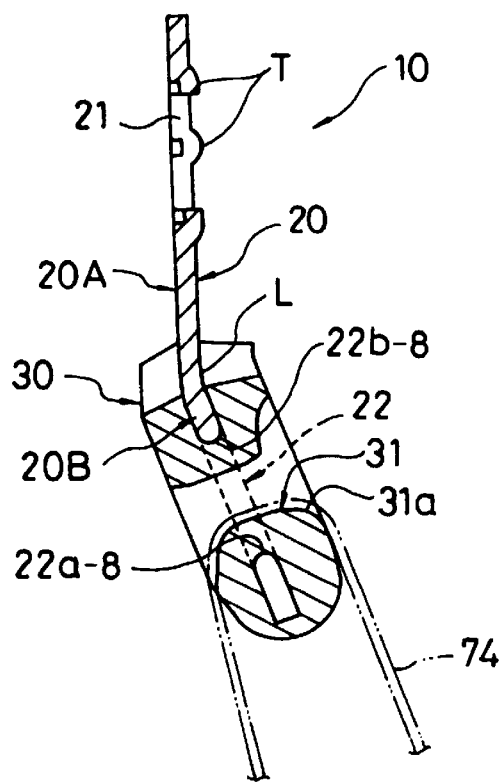
FIG. 30 is a sectional view of the seat belt hanging-and holding member taken along a line 30—30 of FIG. 29.

Next, a tenth embodiment of the present invention will be described with reference to FIGS. 29 to 30. Herein, components common to those of the sixth embodiment illustrated in FIG. 23A–23C are affixed by the same reference symbols as those of FIGS. 23A–23C and the explanation thereof will be omitted. The tenth embodiment is different from the sixth embodiment in that the end parts in the longitudinal direction of the slot 22 are largely opened.

Specifically stated, the short edge parts 22c-8 and 22d-8 of the slot 22 are formed by circular arcs respectively having a diameter larger than the dimension between the long edge parts 22a-8 and 22b-8. The short edge parts 22c-8 and 22d-8 maybe formed in the shape of an elliptically curved surface or in other shapes with a curved surface. In this case, when the short edge parts are formed, for example, in the shape of an elliptically curved surface, the ellipse may be preferably disposed longitudinally as in FIG. 29.

In addition, the short edge parts 22c-8 and 22d-8 of the slot 22 and the long edge parts 22a-8 and 22b-8 adjacent thereto, or the whole periphery of the slot 22 are formed so as to be smoothly curved along the direction in which the waving belt 74 is deflected.

In the case of the-seat belt hanging and holding member 10 constructed as described above, the radius of curvature of the short edge parts 22c-8 and 22d-8 is increased, so that the stress concentration of the short edge parts 22c-8 and 22d-8 can be mitigated. Therefore, stress generated in the short edge parts 22c-8 and 22d-8 can be reduced and the strength of the base member 20 can be substantially improved. Additionally, since a space between the long edge parts 22a-8 and 22b-8 can be narrowed, the width of a part extending along the long edge part 22a-8, that is, the width of a part for supporting the waving belt 74 can be increased. Consequently, the strength of the short edge parts 22c-8 and 22d-8 can be improved relative to a force from the waving belt 74 and the part extending along the one long edge part 22a-8 can be also improved.

Further, since the short edge parts 22c-8 and 22d-8 of the slot 22 and the long edge parts 22a-8 and 22b-8 adjacent thereto, or the whole periphery of the slot 22 come into smooth contact with the coating member 30, stress concentration can be reduced in all the parts of the coating member in contact with the slot 22. Accordingly, strength can be improved in all the parts of the coating member 30 along the slot 22, because of reasons similar to those of the seventh embodiment. If the coating member 30 should be broken, the waving belt 74 would be prevented from being damaged when the waving belt 74 abuts the slot 22, since the slot 22 is formed in the shape of a smoothly curved surface along the direction in which the waving belt 74 is folded back. Besides, the tenth embodiment can realize other operational effects similar to those of the sixth and seventh embodiments.

Now, an eleventh embodiment of the present invention will be described below by referring to FIG. 31. Herein, components common to those of the tenth embodiment seen in FIG. 29 are affixed by the same reference symbol as those of the tenth embodiment and the explanation thereof will be omitted. The difference between the eleventh embodiment and the tenth embodiment resides in that the protruding part 22e-8 is provided along the one long edge part 22a-8 of the slot 22.

Figure 31:
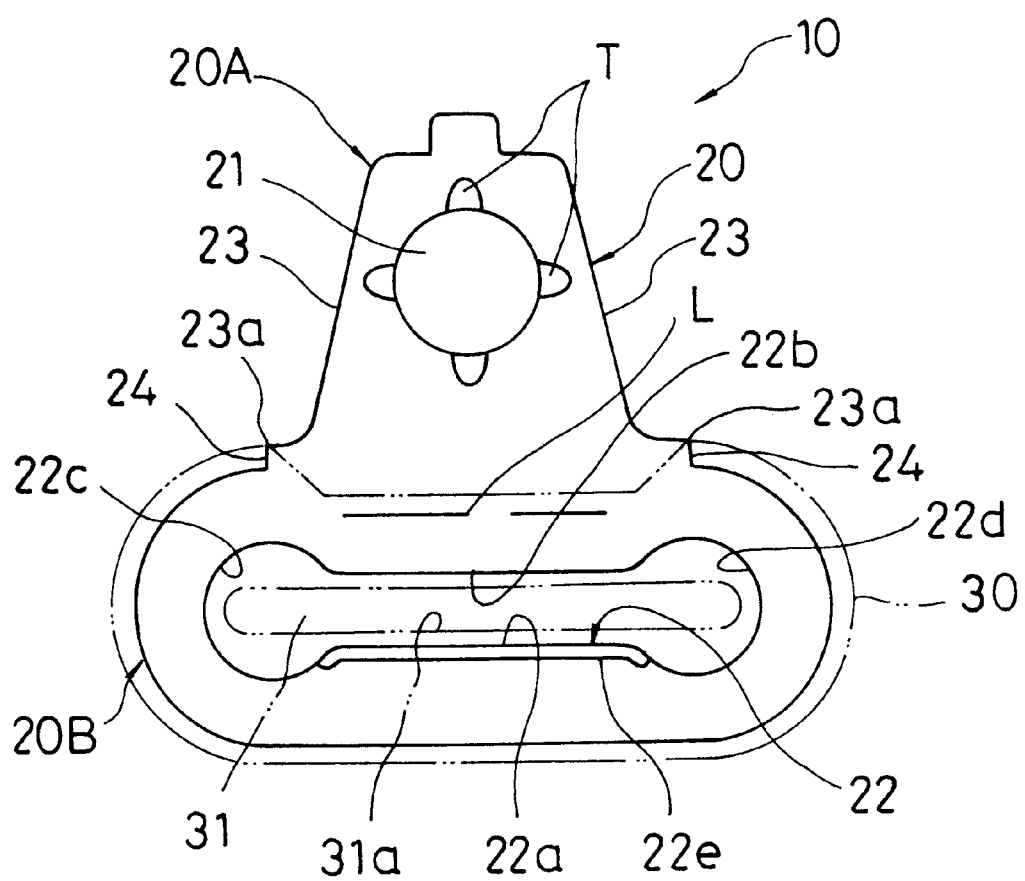
FIG. 31 is a front view showing a base member of a seat belt hanging and holding member illustrated as an eleventh embodiment of the present invention.

Specifically, the swelling part 22e-8 as shown in FIG. 31 is provided in the long edge part 22a-8 of the slot 22 in the side on which the waving belt 74 is folded back.

In the next place, with reference to FIG. 32, a twelfth embodiment of the invention will be described hereinafter. Herein, components common to those of the tenth embodiment shown in FIG. 29 are affixed by the same reference numerals as those of the tenth embodiment and the explanation thereof will be omitted. The twelfth embodiment is different from the tenth embodiment in that the parts 22e-9 are provided in the short edge parts 22c-8 and 22d-8 of the slot 22 and the parts of the long edge parts 22a-b and 22b-b adjacent thereto. Further, the protruding parts 22e-9 are formed with the material similar to that illustrated in FIG. 24A or FIG. 28.

Figure 33:
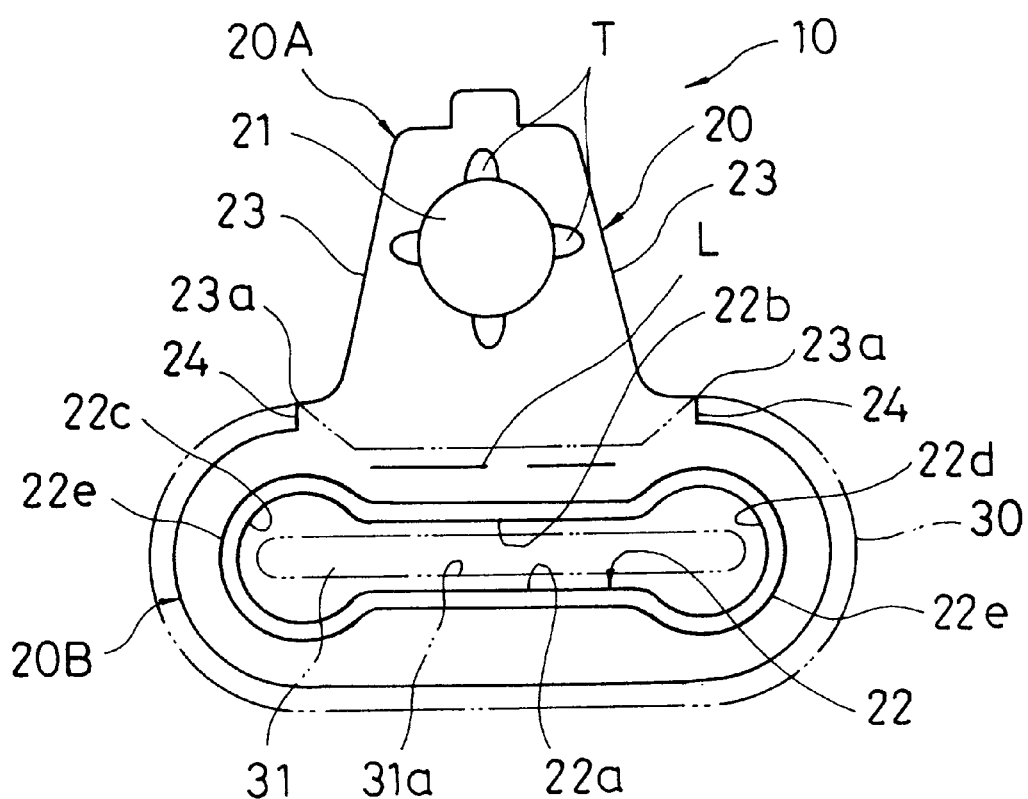
FIG. 33 is a front view showing a base member of a seat hanging and holding member illustrated as a thirteenth embodiment of the present invention.

Now, viewing FIG. 33, a thirteenth embodiment of the present invention will be described in the following. Herein, components common to those of the tenth embodiment illustrated in FIG. 29 are affixed by the same reference symbols as those of the tenth embodiment and the explanation thereof will be omitted. The thirteenth embodiment is different from the tenth embodiment in that the swelling part 22e-10 is provided throughout the whole periphery of the slot 22. Further, the swelling part 22e-10 is formed with the member similar to that seen in FIG. 24A or FIG. 28.

Figure 34:
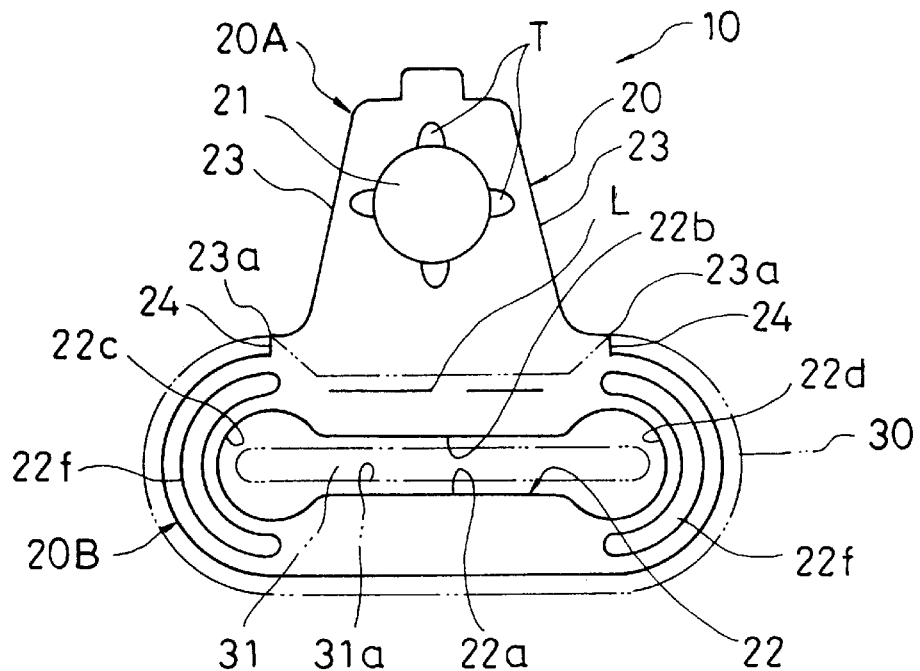
FIG. 34 is a front view showing a base member of a seat belt hanging and holding member illustrated as a fourteenth embodiment of the present invention.

A fourteenth embodiment of the present invention will be now described by referring to FIG. 34. Herein, components common to the tenth embodiment shown in FIG. 29 are affixed by the same reference symbols as those of the tenth embodiment and the explanation thereof will be omitted. The difference between the fourteenth embodiment and the tenth embodiment resides in that reinforcing parts 22f are provided along the outside parts of the short edge parts 22c-8 and 22d-8 of the slot 22.

Figure 35:
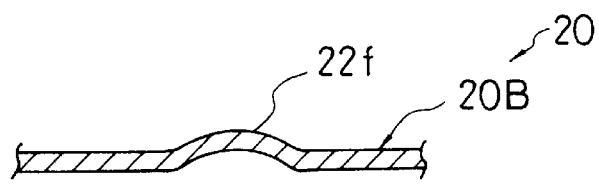
FIG. 35 is a sectional view showing the reinforcing part of the seat belt hanging and holding member.
Figure 36:
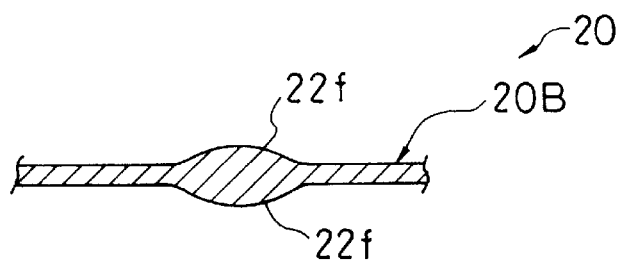
FIG. 36 is a sectional view showing an alternative example of the reinforcing part of the seat belt hanging and holding member.

Specifically stated, the reinforcing parts 22f are, as shown in FIG. 35, formed so as to protrude to one surface side of the seat belt holding part 20B. Further, the reinforcing parts 22f may be, as illustrated as 21f-1 in FIG. 36, formed so as to protrude to one surface side and to the other surface side. The strength in the peripheries of the short edge parts 22c-8 and 22d-8 on the base member 20 can be improved by providing the reinforcing parts 22f.

Figure 37A:
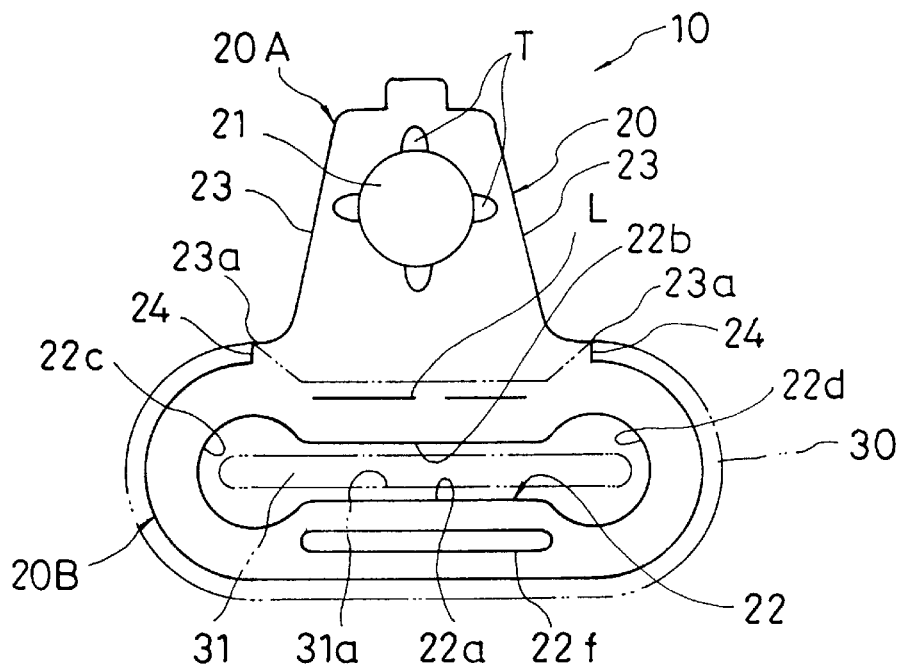
FIGS. 37A–37D show a base member of a seat belt hanging and holding member illustrated as a fifteenth embodiment of the present invention.

A fifteenth embodiment of the present invention will be next described with reference to FIG. 37A. Herein, components common to those of the tenth embodiment shown in FIG. 29 are affixed by the same reference numerals as those of the tenth embodiment and the explanation thereof will be omitted. The fifteenth embodiment is different from the tenth embodiment in that the reinforcing part 22f is provided along a part outside the one long edge part 22a-8 of the slot 22 as a reinforcing part 22f-2.

That is, the reinforcing part 22f illustrated in FIG. 35 is provided along a part in the lower side of the long edge part 22a-8 of the slot 22 on which the waving belt 74 is deflected. Thus, the strength of a part in the base member 20 for holding the waving belt 74 can be improved by the above described reinforcing member 22f-2.

Figure 37B:
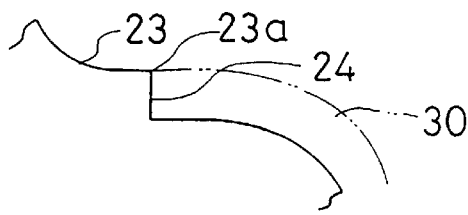
Figure 37C:
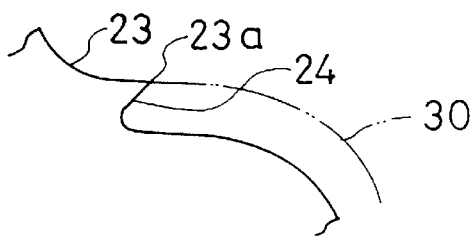
Figure 37D:
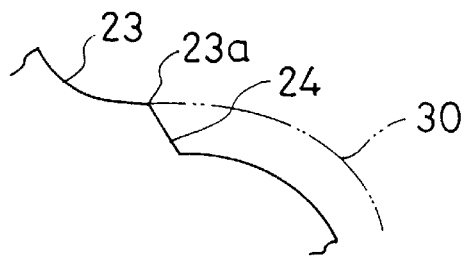
Figure 38:
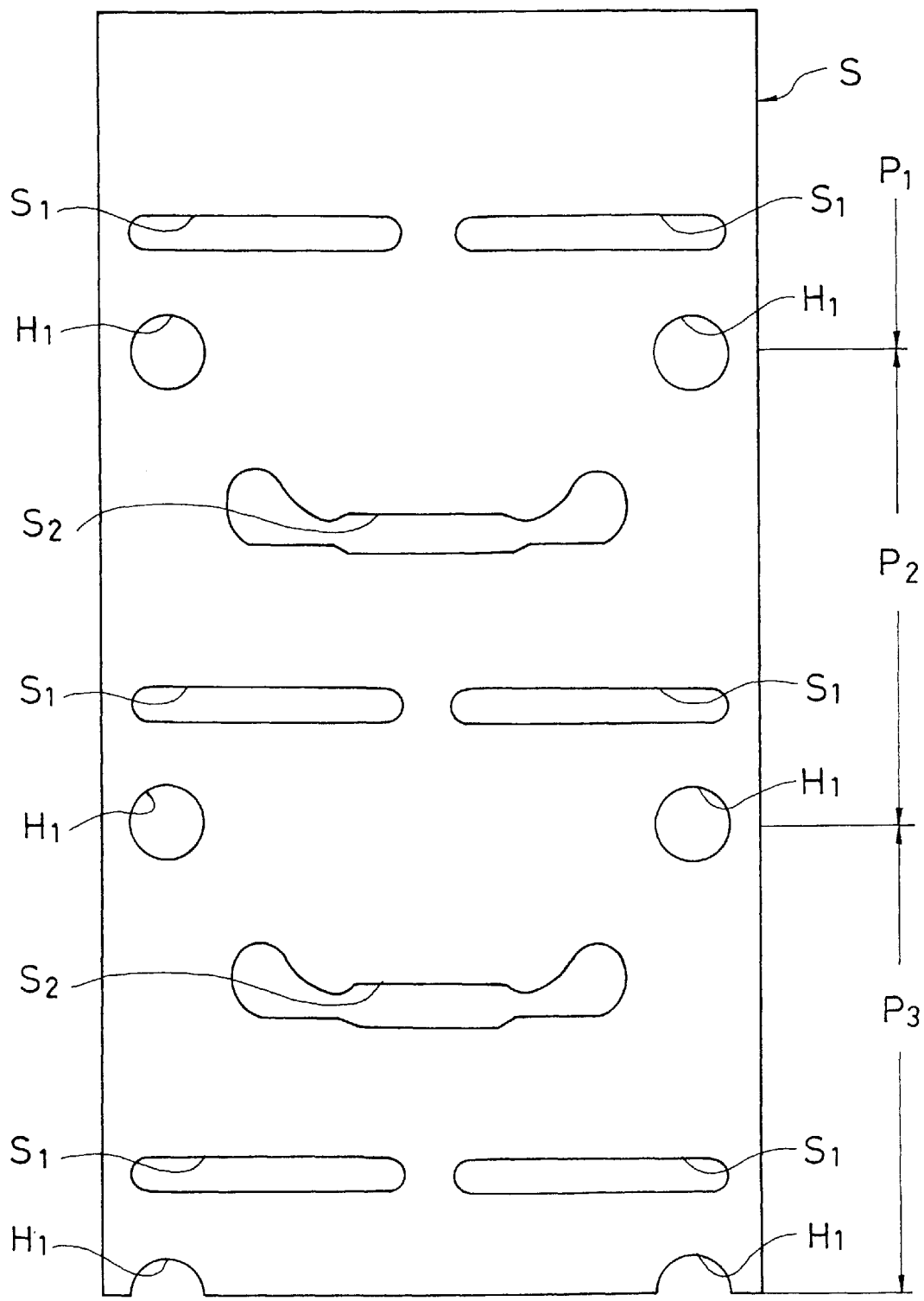
FIG. 38 is a plan view of a high-tension steel plate showing first to third processes for manufacturing the base member of the seat belt hanging and holding member.
Figure 39:
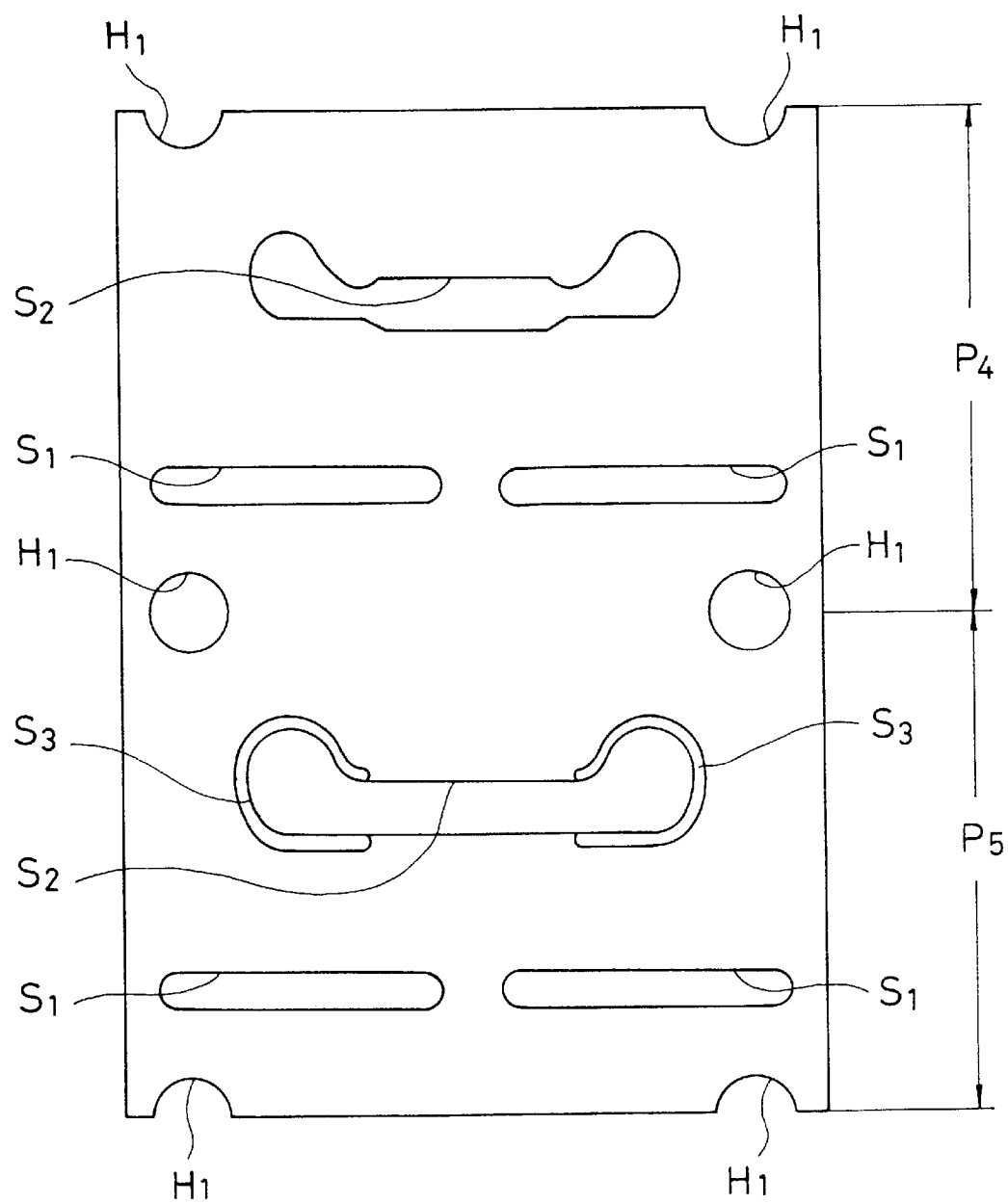
FIG. 39 is a plan view of the high-tension steel plate showing fourth to fifth processes for manufacturing the base member of the seat belt hanging and holding member.
Figure 40:
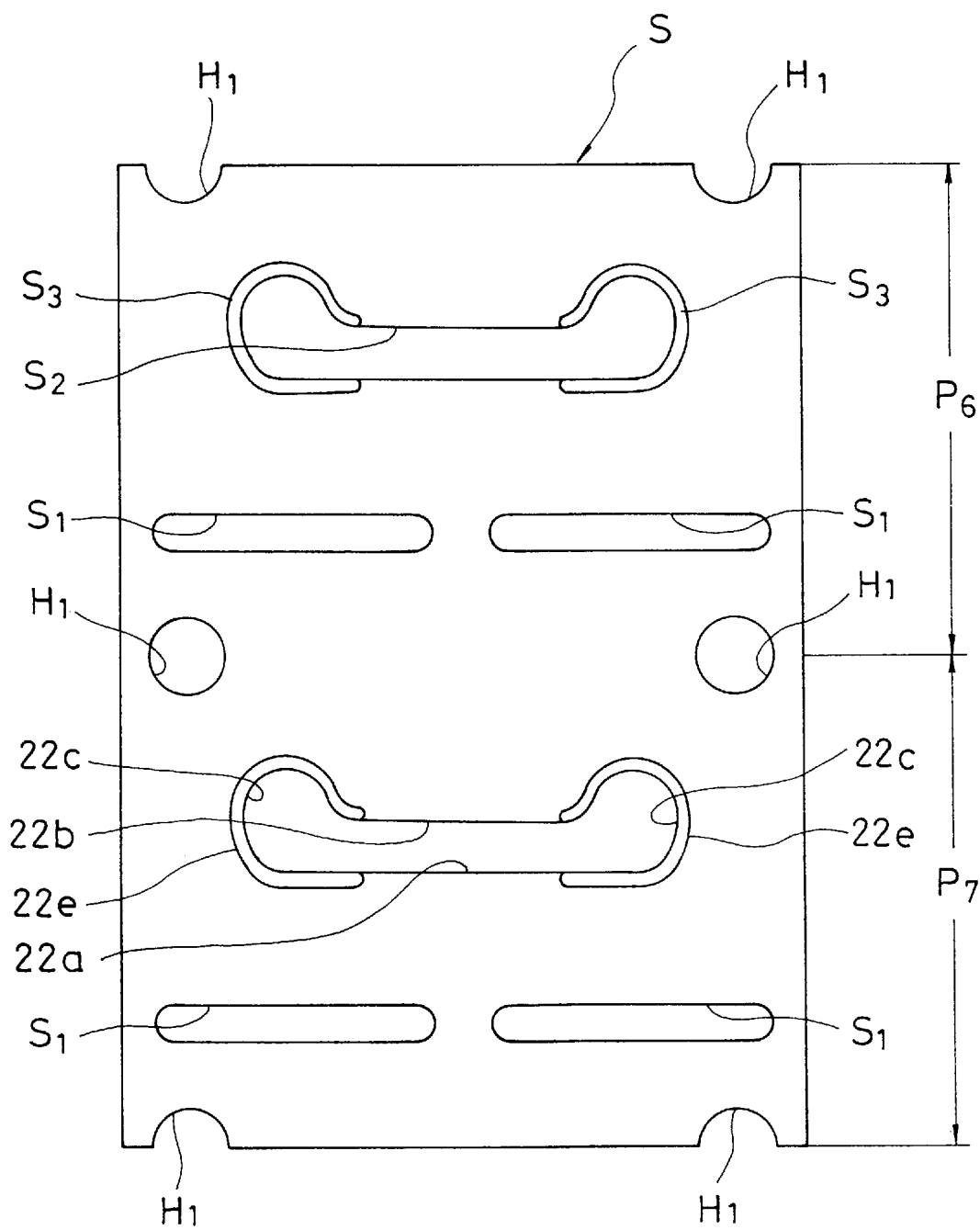
FIG. 40 is a plan view of the high-tension steel plate showing sixth to seventh processes for manufacturing the base member of the seat belt hanging and holding member.
Figure 41:
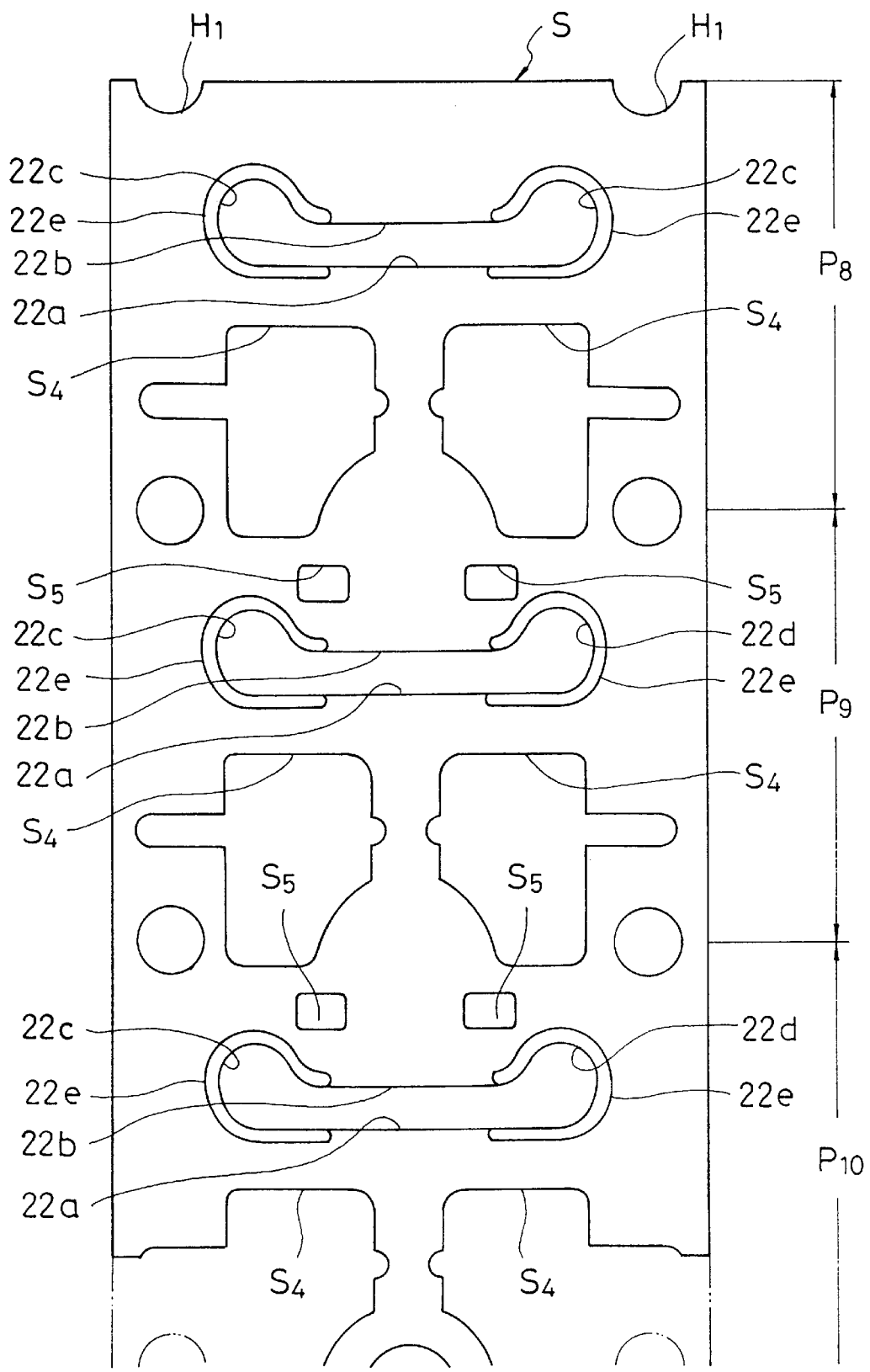
FIG. 41 is a plan view of the high-tension steel plate showing eighth to tenth processes for manufacturing the base member of the seat belt hanging and holding member.
Figure 42:
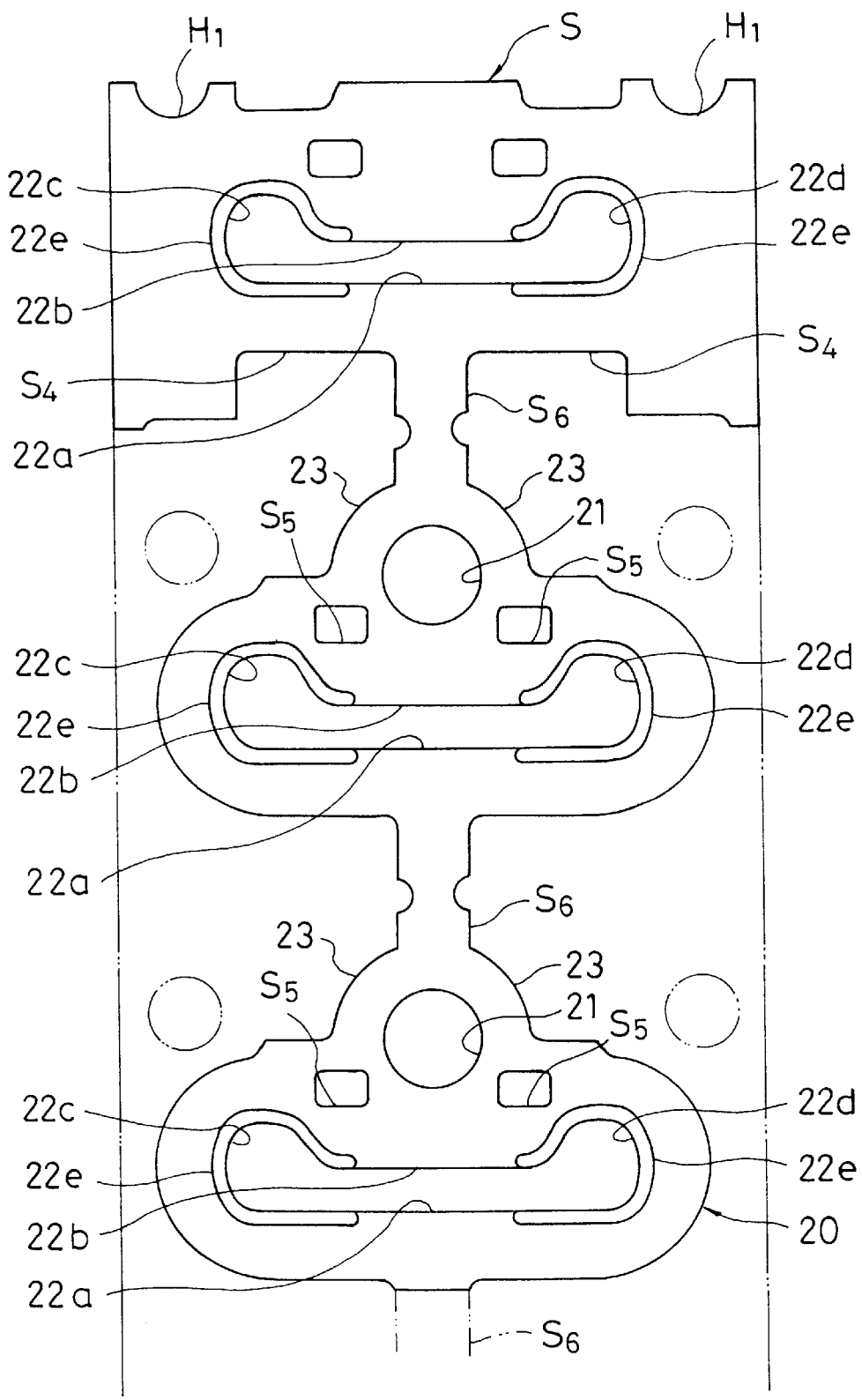
FIG. 42 is a plan view of the high-tension steel plate showing tenth to eleventh processes for manufacturing the base member of the seat belt hanging and holding member.

Although, in the sixth to fifteenth embodiments, the step part 24 is, as shown in FIG. 37B, formed substantially at right angles with the outer peripheral edge part 23, the step part 24 may be formed, as shown as step part 24-1 in FIG. 37C, so as to bite obliquely the inside of the outer peripheral edge part 23 or maybe formed, as shown as step part 24-2 in FIG. 37D, so as to be slantingly inclined to the coating member 30 side. In this case, in order to prevent a resin from leaking along the outer peripheral edge part 23, the step part 24 may be preferably formed, as illustrated in FIG. 37B, substantially at right angles with the outer peripheral edge part 23, or as illustrated in FIG. 37C, formed so as to bite obliquely the inside of the peripheral edge part 23.

Further, although, in the sixth to fifteenth embodiments, the height of the step part 24 is set so that the surface of the coating member 30 is substantially flush with the surface of the outer peripheral edge part 23, the height of the step part 24 may be preferably set so that the surface of the outer peripheral edge part 23 is slightly higher than that of the coating member 30 in order to prevent the resin from leaking along the outer, peripheral edge part 23.

Additionally, it is desired to form the base member 20 shown in the first to fifteenth embodiments in accordance with a cold-working method by using a high-tension steel. For the high-tension steel, the steel having chemical components shown in Table 1 may be preferably used. The test results of this high-tension steel are shown in Table 2.

The base member 20 is formed under a cold-working method by using the above mentioned high-tension steel, so that the base member 20 whose finish accuracy and dimensional accuracy are considerably excellent can be obtained. Thus, when the base member 20 is inserted into a metal mold to be subjected to an insert-molding method, an abnormal force due to the deflection of the base member 20 is not exerted on the metal mold from the base member 20. Accordingly, the duration of life of the metal mold can be improved. Further, the steel is work-hardened under a cold-working method and a sufficient strength can be obtained, so that thermal treatment is not needed. Thus, the number of production processes for the base member 20 can be decreased: Furthermore, since the base member is formed with the high-tension steel, there is no fear of hydrogen brittleness after a plating process, and therefore, the thermal treatment for removing the hydrogen brittleness is not required. Therefore, the number of production processes can be further reduced and the cost can be lowered.

Next, processes for cold-working the base member 20 of high-tension steel will be described with reference to FIGS. 38 to 42. In this case, the base member 20 manufactured in accordance with the cold-working method corresponds to the base member 20 shown in FIG. 24A and is provided with the protruding part 22e protruding merely to one side, as illustrated in FIG. 28. The part of the slot 22 which is not provided with the protruding part 22e is, as shown in FIG. 30, is formed in the shape of a curved surface.

The above mentioned base member 20 is, manufactured by a press machine set for automatically and continuously carrying out the operations of respective processes illustrated in FIGS. 38 to 42.

Initially, a high-tension steel plate S wound in the shape of a coil as a raw material of the base member 20 is fed one by one to the press machine while it is adjusted to a flat shape.

Then, in the first process P1 (see FIG. 38), slits S1 are initially punched out to divide the respective base members 20 which are successively formed and positioning holes H1 are also punched out. At this time, marks such as required numeric characters, symbols, etc. are simultaneously pressed.

Next, in the second process P2, lower holes S2 for forming the slots 22 are punched out. At this time, burs are produced in the side toward which the lower holes S2 are punched out.

Then, in the third process P3, the angular parts of the side in which the burs of the lower holes S2 are produced are face-pressed so that the angular parts of the lower slots S2 are finished to be rounded. Thus, the burs produced in the second process are pressed inward so that they are apparently removed.

Further, in the fourth process P4 (see FIG. 39), angular parts opposite to the above described burs of the lower slots S2 are face-pressed so that the angular parts are finished to be rounded. Thus, the lower slots S2 subjected to the third and fourth processes have their entire peripheries neatly finished so as to have a curved surface as illustrated in the long edge parts 22a and 22b of FIG. 30.

Next, in the fifth process P5, parts corresponding to the short edge parts 22c and 22d of the-slots 22 in the lower holes S2 are bent so that protruding parts S3 corresponding to protruding parts 22e are formed, At this time, the peripheral parts of the protruding parts S3 are slightly curved toward the direction to which the protruding parts S3 protrude. That is, the peripheral parts of the protruding parts S3 are formed in a distorted shape.

Thus, in the sixth process P6 (see FIG. 40), the peripheral parts of the protruding parts S3 are formed so as to be flat. Thus, only the protruding parts S3 protrude from the flat high-tension steel plate S. At this time, the protruding parts S3 are simultaneously formed.

Then, in the seventh process P7, a face pressing is made along the lower slots S2, go that the protruding parts S3 and other parts are finished in the shape of a smoothly curved surface. Thus, the protruding parts S3 are formed to become short edge parts 22c and 22d having the protruding parts 22e with curved surfaces as shown in FIG. 28 and other parts to become long edge parts 22a and 22b with curved surfaces as shown in FIG. 30.

Then, in the eighth process P8 (see FIG. 41), holes S4 are punched out for forming the adjacent upper side parts and lower side parts of the base members 20.

Further, in the ninth process P9, required holes S5 are punched out.

Next, in the tenth process P10, bolt-inserting holes 21 are punched out and the outer peripheral edge parts 23 of the base members 20 are punched out. In this case, only connecting plates S6 for connecting the adjacent base members 20 together are left as they are.

Then, in the eleventh process P11, the connecting plates S6 are cut from the adjacent base members 2.0, so, that the individually separated base members 20 are completed.

According to the manufacturing method of the base member 20 constructed as mentioned above, since the edge parts of the lower hole S2 are bent so that the swelling parts 22e are formed. Thus, the protruding parts 22e can largely protrude from the surface of the base member 20. Further, the protruding parts 22e and other parts can be neatly finished in the shape of a smoothly curved surface by face-pressing. Specifically, the edge parts of the slot 22 can be finely finished in the shape of a curved surface only by a press machine, so that a finish-working (a barrel polishing work) does not need to be done in another process. Therefore, the cost can be lowered.

Figure 32:
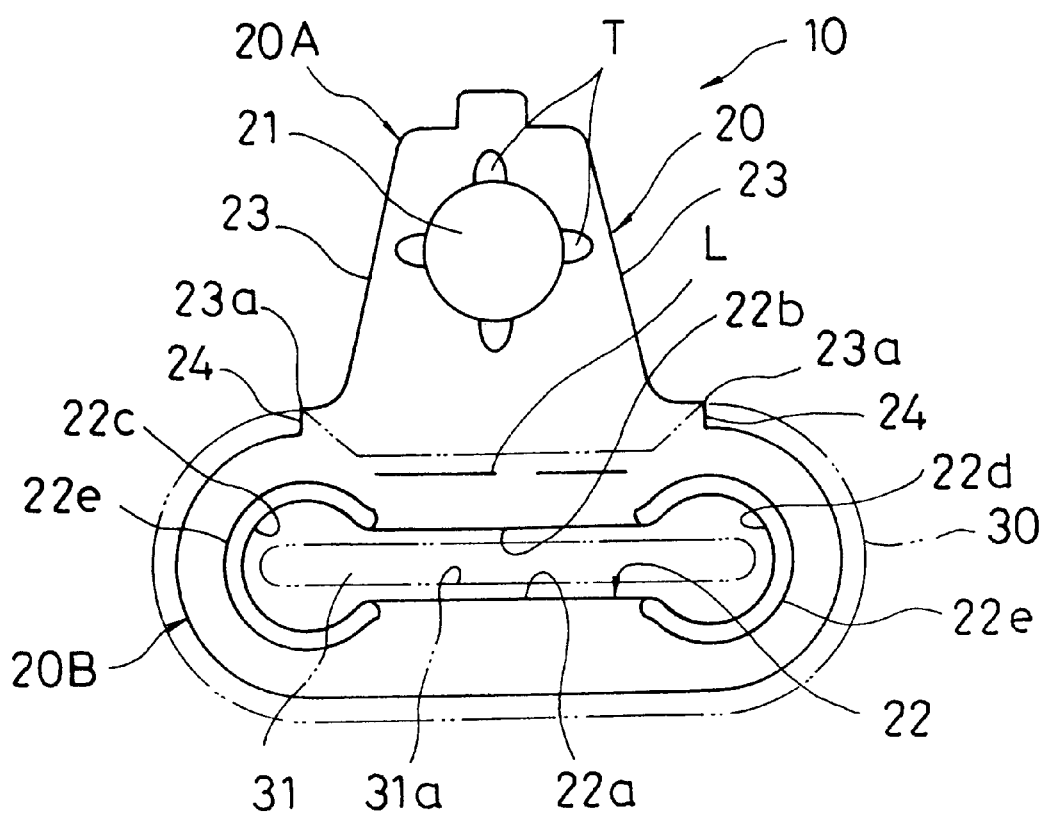
FIG. 32 is a front view showing a base member of a seat belt hanging and holding member illustrated as a twelfth embodiment of the present invention.

In addition, the degree of extension of the protruding parts 22e can be 0.2 to 0.5 times as thick as the thickness of a base 2, as illustrated in FIG. 32. Therefore, the contact area between the slot 22 and the coating member 30 can be increased, so that a face pressure exerted on the coating member 30 can be lowered.

When the processes of FIGS. 6 to 8 shown in the first embodiment are carried out in addition to the fifth process PS for forming the protruding parts S3, the protruding parts 22e respectively protruding to one and the other sides of the base member 20 can be formed. In other words, the protruding parts 22e shown in FIG. 24 can be formed. The degree of extension of the respective protruding parts 22e produced in this case can reach 0.2 to 0.5 times as thick to as the thickness of the base member 20. Further, also in the production processes shown in FIGS. 2 to 8 and FIGS. 17 to 19, the degree of extension of the respective protruding parts 22e can reach 0.2 to 0.5 times as thick as the thickness of the base 2.

When the seat belt is in a state where it can be supplied, the seat belt can be slidingly supplied while the intermediate part of the seat belt is folded back on the coating member, for example, by pulling the seat belt. However, when the supply of the seat belt is stopped, a force for pulling the seat belt is directly exerted on the coating member.

The force directly applied to the coating member is directly exerted on the slot of the base member through the coating member. The coating member undergoes, as its reaction, a reaction force from the edge parts of the slot. However, since at least the edge part of the slot corresponding to a position on which the seat belt is folded back is formed in the shape of a smoothly curved surface along the direction in which the seat belt is folded back, the stress concentration of the coating member in contact with the edge part of the slot is decreased. Consequently, even when a force acts on the coating member from the edge part of the slot, a large stress is not generated in the coating member and such a result can be obtained that a strength is substantially increased over that of a conventional one. Accordingly, since the thickness of the coating member can be reduced in proportion to the increase of strength, the material cost of the coating member can be lowered without deteriorating a safety owing to the decrease of strength of the coating member. Thus, the cost can be lowered.

Since the thickness of the coating member is set by employing an excessively sufficient safety factor, the coating member should not be broken. If the coating member should be broken, the seat belt would not be cut when it abuts the edge part of the slot, since the edge part of the slot corresponding to a position on which the seat belt is folded back is formed in the shape of a curved surface. In other words, if the coating member is broken, safety of the seat belt can be ensured.

In addition, if the coating member should be damaged, the seat belt would not be cut. Therefore, a thinner coating member may be possibly formed.

According to another embodiment, since at least the edge parts of the slot corresponding to a part on which the seat belt is folded back protrude to one surface side of the base member and are formed in the shape of a smoothly curved surface along the direction in which the seat belt is deflected, the radius of curvature of the edge parts can be increased. Thus, the stress concentration of the coating member in contact with the edge parts can be decreased. Further, a face pressure acting on the coating member from the edge parts can be decreased, so that a force acting on the coating member from the base member can be furthermore softened reduced.

According to another embodiment edge parts of the slot protrude to one surface side and the other surface side of the base member, a force acting on the coating member can be mitigated.

According to another embodiment, since the end parts of the slot in its longitudinal direction are formed in the shape of a smoothly curved surface along the direction in which the seat belt is folded back, the stress concentration of the coating member in contact with the end parts of the slot can be decreased. Therefore, even if the seat belt concentrically gathers to, for example, the one end part side in the longitudinal direction of the slot, the force exerted on the coating member from the end parts is distributed, so that the force exerted on the coating member from the base member can be reduced.

According to another embodiment, since the end parts of the slot in its longitudinal direction are formed so as to protrude to one surface side of the base member, or both one surface side and the other surface side, the radius of curvature of the end parts formed in the shape of a curved surface can be increased. Thus, the stress concentration of the coating member coming into contact with the end parts can be further decreased. Further, a face pressure acting on the coating member form the end parts can be decreased. Accordingly, the force exerted on the coating member from the base member an be further softened.

According to another embodiment since the step part set by one step lower than the outer peripheral edge part of the base member is provided in the boundary part between the outer peripheral edge part and the coating member, a resin can be prevented from leaking along the outer peripheral edge part of the base member from the boundary part during insert-molding. Accordingly, the burs formed with the coating member can be prevented from being produced in the boundary part between the outer peripheral edge part of the base member and the coating member.

Further, since the leakage of the resin can be prevented, as described above the closing force of the metal mold does not need to be strongly set in order to prevent the leakage of the resin. Thus, the durability of the metal mold can be Improved.

According to an alternative embodiment, since the base member is formed by cold-working the raw material of high-tension steel, the base member whose surface finish accuracy and dimensional accuracy are remarkably good can be obtained. Therefore, when the base member is inserted into the metal mod for insert-molding, an abnormal force is not exerted on the metal mold from the base member. Accordingly, the duration of life of the metal mold can be improved. Further, the base member is work-hardened in accordance with a cold-working method and a sufficient strength can be obtained, so that the base member does not need to be subjected to a thermal treatment. Thus, the number of production processes can be decreased. Further, since the base member is formed with the high-tension steel, there is no fear of hydrogen brittleness nor the thermal treatment for removing the hydrogen brittleness is needed. Therefore, the number of production processes can be further decreased, so that the cost can be lowered.

TABLE I

| CHEMICAL COMPONENTS % (CAST ANALYSIS) | |
|---|---|
| C | 0.15 OR LOWER |
| Si | 1.50 OR LOWER |
| Mn | 1.80 OR LOWER |
| P | 0.030 OR LOWER |
| S | 0.010 OR LOWER |
| Al | 0.080 OR LOWER |
| AND OTHERS | Cr |

TABLE 2

| YIELD POINT $N/mm^2$ | — (YIELD RATIO, 70% OR MORE) | | |
|---|---|---|---|
| TENSILE STRENGTH $N/mm^2$ | 780 OR MORE | | |
| TENSILE TEST | | | |
| ELON-GATION | BOARD THICKNESS mm | 2.0 TO SMALLER THAN 2.5 | 2.5 TO SMALLER THAN 3.0 | 3.0 TO 4.5 |
| | % | 18 OR LARGER | 19 OR LARGER | 20 OR LARGER |
| | TEST PIECE | DIRECTION JIS NO.5 PERPENDICULAR TO ROLLING DIRECTION | | |
| BENDING TEST | | | |
| TEST PIECE JIS NO.3 | BOARD THICKNESS mm | 2.0 TO 3.2 | LARGER THAN 3.2 TO 4.5 |
| DIRECTION PERPENDICULAR TO ROLLING DIRECTION | INSIDE RADIUS BENDING ANGLE | 1.0T 180° | 1.5T |

I claim:

1. A seat belt hanging and holding member for slidably hanging and holding a seat belt comprising:
    a base member made of metal having first and second opposing surfaces and a slot extending therethrough having a longitudinal axis such that an end of a seat belt is inserted through said slot and then folded back upon itself; and
    a coating member made of a synthetic resin for covering at least the periphery of said slot of said base member and having a seat belt-inserting hole corresponding to said slot;
    said slot having a first edge part for engaging a seat belt, said first edge part protruding and smoothly curved from said first surface of said base member and smoothly curved in a direction normal to said longitudinal axis of said slot.

2. A seat belt hanging and holding member according to claim 1, wherein said first edge part protrudes from said first and second surfaces of said base member and is smoothly curved in a direction normal to said longitudinal axis of said slot, said first edge part smoothly curved from said first surface of said base member to said second surface of said base member.

3. A seat belt hanging and holding member for use with a seat belt webbing, said seat belt hanging and holding member comprising:

a base member having first and second opposing surfaces and a slot extending therethrough for engaging a seat belt webbing, said slot defined by first and second long edges opposing each other and short edges connecting said first and second long edges; and a synthetic resin coating covering said first and second long edges and said short edges of said slot, wherein a first protrusion extending and smoothly curved from said first surface of said base member is formed on at least said short edges.

4. A seat belt hanging and holding member according to claim 3, wherein said first protrusion is further formed on at least a portion of said first long edge.

5. A seat belt hanging and holding member according to claim 4, wherein said first protrusion is further formed on at least a portion of said second long edge.

6. A seat belt hanging and holding member according to claim 5, wherein said base member is made of high-tension steel and said first protrusion is characterized by being formed by cold-working.

7. A seat belt hanging and holding member according to claim 4, wherein said base member is made of high-tension steel and said first protrusion is characterized by being formed by cold-working.

8. A seat belt hanging and holding member according to claim 3, further comprising a second protrusion extending and smoothly curved from said second surface of said base member formed on at least said short edges, said first and second protrusions forming a smooth curve from said first surface to said second surface.

9. A seat belt hanging and holding member according to claim 8, wherein said second protrusion is further formed on at least a portion of said first long edge.

10. A seat belt hanging and holding member according to claim 9, wherein said second protrusion is further formed on at least a portion of said second long edge.

11. A seat belt hanging and holding member according to claim 10, wherein said base member is made of high-tension steel and said first and second protrusions are characterized by being formed by cold-working.

12. A seat belt hanging and holding member according to claim 8, wherein said base member is made of high-tension steel and said first and second protrusions are characterized by being formed by cold-working.

13. A seat belt hanging and holding member according to claim 9, wherein said base member is made of high-tension steel and said first and second protrusions are characterized by being formed by cold-working.

14. A seat belt hanging and holding member according to claim 3, wherein said base member is made of high-tension steel and said first protrusion is characterized by being formed by cold-working.

15. A seat belt hanging and holding member for use with a seat belt webbing, said seat belt hanging and holding member comprising:

a base member having first and second opposing surfaces and a slot extending therethrough for engaging a seat belt webbing, said slot defined by first and second long edges opposing each other and short edges connecting said first and second long edges;

a synthetic resin coating covering said first and second long edges and said short edges of said slot, and a first protrusion extending from said first surface of said base member formed on at least said short edges, wherein said first protrusion is machined so as to be formed in an entirely smoothly curved surface characterized by having employed a lower metal mold and an upper metal mold.

* * * * *